United States Patent
Li et al.

(10) Patent No.: US 7,724,953 B2
(45) Date of Patent: May 25, 2010

(54) WHITEBOARD, BLACKBOARD, AND DOCUMENT IMAGE PROCESSING

(75) Inventors: Hsiang-Tsun Li, San Diego, CA (US); Szepo Robert Hung, Carlsbad, CA (US); Xiaoyun Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 865 days.

(21) Appl. No.: 11/533,664

(22) Filed: Sep. 20, 2006

(65) Prior Publication Data

US 2007/0269124 A1    Nov. 22, 2007

Related U.S. Application Data

(63) Continuation-in-part of application No. 11/436,470, filed on May 17, 2006.

(51) Int. Cl.
*G06K 9/34* (2006.01)
(52) U.S. Cl. ............... 382/173; 382/164; 382/165
(58) Field of Classification Search ........... 382/165, 382/173, 164; 348/239, 207.2, E5.024; 358/1.9, 358/518, 502; 345/32; 349/10, 114
See application file for complete search history.

(56) References Cited

U.S. PATENT DOCUMENTS

| | | | | |
|---|---|---|---|---|
| 6,480,624 | B1 * | 11/2002 | Horie et al. | 382/165 |
| 7,283,162 | B2 * | 10/2007 | Silverbrook et al. | 348/239 |
| 2004/0165786 | A1 | 8/2004 | Zhang et al. | |
| 2004/0218069 | A1 | 11/2004 | Silverstein | |

OTHER PUBLICATIONS

Zhengyou Zhang et al: "Notetaking with a camera: whiteboard scanning and image enhancement" Acoustics, Speech, and Signal Processing, 2004, Proceedings, (ICASSP '04). IEEE International Conference on Ontreal, Quebec, Canada May 17-21, 2004, Piscataway, NJ, USA, IEEE, vol. 3, May 17, 2004, pp. 533-536, XP010718244.
Eagle et al: Projection Method for Edge and Corner Location for Image Extraction IP.COM Journal, IP.COM Inc., West Henrietta, NY, US, Mar. 1, 1995, pp. 1-5, XP013103035.
International Search Report- PCT/US2007/079089, International Search Authority- European Patent Office- Apr. 15, 2008.
Written Opinion—PCT/US2007/079089, International Search Authority- European Patent Office- Apr. 15, 2008.
Zhang, et al., "Whiteboard It! Convert Whiteboard Content into an Electronic Document", Microsoft Research, Aug. 12, 2002, pp. 1-16.

* cited by examiner

*Primary Examiner*—Anh Hong Do
(74) *Attorney, Agent, or Firm*—Timothy F. Loomis; Espartaco Diaz Hidalgo

(57) ABSTRACT

Methods and apparatus for processing a captured image of a medium, content on the medium, and a background surrounding the medium are provided. A captured image is processed by 1) improving the visibility of the content by recovering the original appearance of the medium and enhancing the appearance of the content image, 2) removing the background by determining the boundary of the medium, and/or 3) correcting geometric distortion in the content to improve readability. Any of the three processing steps may be used alone or any combination of the three processing steps may be used to process the image. The image processing may operate on the image after it is captured and stored to a memory and may be implemented on an image-capturing device that captures the image. In other embodiments, the image processing is implemented on another device that receives the image from the image-capturing device.

48 Claims, 20 Drawing Sheets

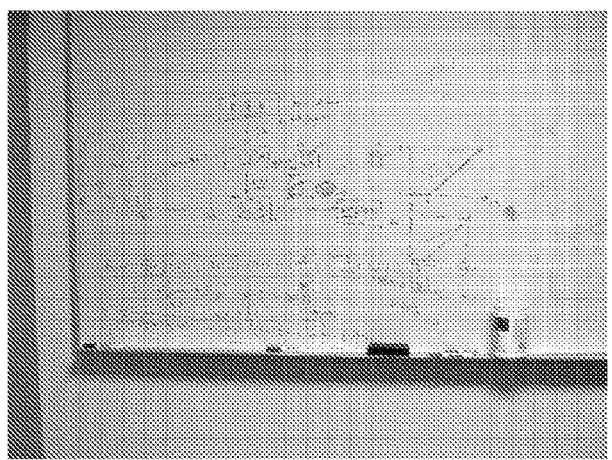
FIG. 25A
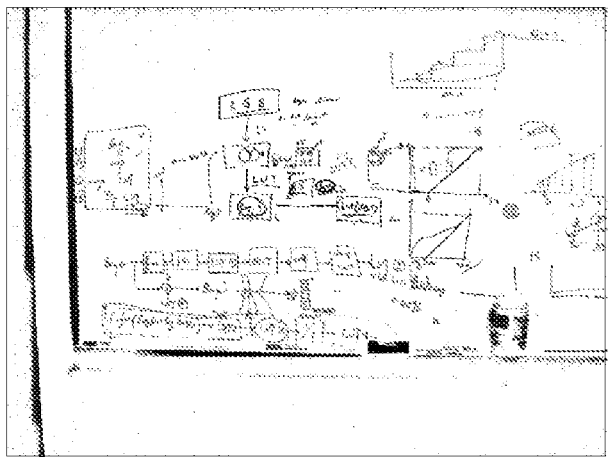
FIG. 25B
FIG. 25C

WHITEBOARD, BLACKBOARD, AND DOCUMENT IMAGE PROCESSING

RELATED APPLICATIONS

This patent application claims benefit to and is a continuation-in-part of the United States Patent Application entitled "Line or Text-Based Image Processing Tools," having Ser. No. 11/436,470, filed on May 17, 2006.

BACKGROUND

1. Field

The present embodiments relate generally to processing images of whiteboards, blackboards, or documents.

2. Background

Whiteboards, blackboards, or documents are widely used in discussions and meetings to illustrate ideas and information. An image of whiteboard, blackboard, or document content (comprising, for example, text or lines) may be captured by an image-capturing device (e.g., camera or phone camera). Often the captured image is of poor quality and may include distortions, shading, non-uniformity of illumination, low contrast, and/or noise that make it difficult to discern the content of the whiteboard, blackboard, or document. As such, there is a need for a method for processing images of whiteboard, blackboard, or document content to improve the visibility of the content while also being robust and efficient for implementation on a mobile platform (such as a camera or phone camera).

SUMMARY

Some aspects provide methods and apparatus for processing a captured image. The captured image comprises an image of a medium (e.g., whiteboard, blackboard, or document), an image of content (e.g., text or lines) on the medium, and an image of a background surrounding the medium. The captured image is processed by improving the visibility of the content, removing the background in the captured image, and/or improving the readability of the content.

In some aspects, a captured image is processed by 1) improving the visibility of the content image by recovering the original appearance of the medium (e.g., by changing the medium image to have a consistent illumination intensity) and enhancing the appearance of the content image, 2) removing the background image by determining the boundary of the medium image, and/or 3) compensating/correcting any geometric line or shape distortion in the content image to produce lines or shapes that appear "upright." In other aspects, any of the three processing steps may be used alone or any combination of the three processing steps may be used to process an image. After processing the image, the content will have improved visibility (e.g., have clearer image quality, better contrast, etc.) with less geometric distortion and have the background image removed. Also, the processed image will have smaller file size after compression (e.g., JPEG compression).

In some aspects, the methods comprise post-processing methods that operate on the image after it is captured and stored to a memory. In some aspects, the methods and apparatus are implemented on an image-capturing device that captures the image. In other aspects, the methods and apparatus are implemented on another device that receives the image from the image-capturing device.

BRIEF DESCRIPTION OF THE DRAWINGS

The present disclosure is further described in the detailed description which follows, by reference to the noted drawings by way of non-limiting example embodiments, in which like reference numerals represents similar parts throughout the several views of the drawings, and wherein:

FIG. 25A shows an example of a captured image of a whiteboard;

FIG. 25B shows the image of FIG. 25A after the image enhancement step;

FIG. 25C shows the image of FIG. 25B after the whiteboard boundary has been determined and the whiteboard and content have been mapped;

DETAILED DESCRIPTION

The disclosure of United States Patent Application entitled entitled "Line or Text-Based Image Processing Tools," having Ser. No. 11/436,470, filed on May 17, 2006, is expressly incorporated herein by reference.

The word "exemplary" is used herein to mean "serving as an example, instance, or illustration." Any embodiment described herein as "exemplary" is not necessarily to be construed as preferred or advantageous over other embodiments.

In the discussion below, Section I provides general terms and a general environment in which an image processing system operates. Section II describes an image enhancement step that improves the visibility of the content image by recovering the original appearance of the medium and enhancing the appearance of the content image. Section III describes an image processing step that removes the background image and retains the content image. Section IV describes an image processing step that compensates/corrects geometric line or shape distortion in the content image to improve readability of the content image. Section V provides examples of the image processing steps described in Sections II, III, and IV.

I. General Terms and Image Processing Environment

Figure 1:
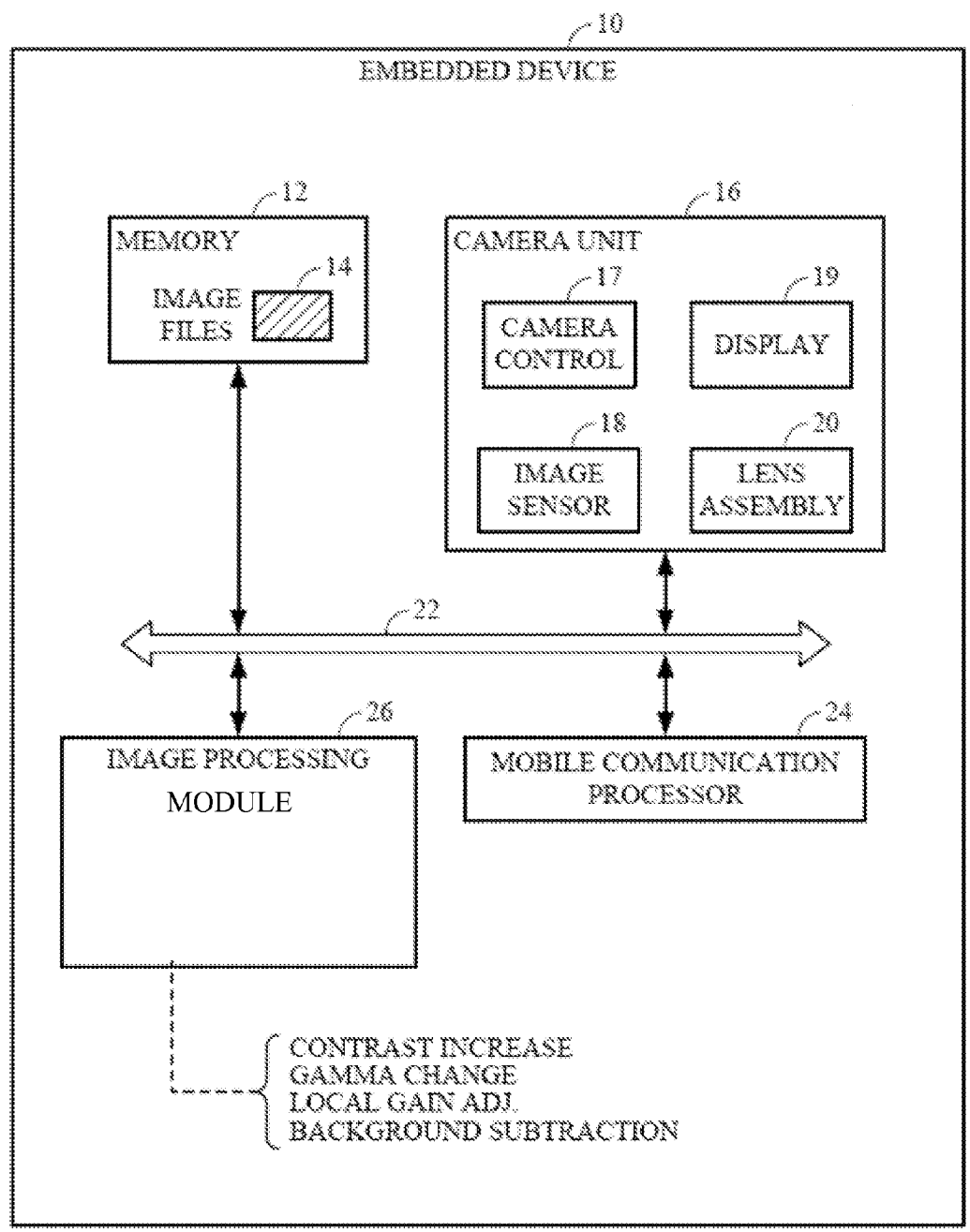
FIG. 1 is a block diagram of an embedded device in which some embodiments are implemented.

FIG. 1 is a block diagram of an embedded device 10 in which some embodiments are implemented. The embedded device 10 comprises, for example, a camera, a mobile phone (with voice transmission capabilities) with a camera, or another type of device (as discussed below in relation to FIG. 3). In this exemplary embodiment, the embedded device 10 comprises a mobile phone with a camera. The device 10 comprises a memory 12 that stores image files 14, a camera unit/image capturing device 16, an image processing module 26, and a mobile communication processor 24. These components are coupled to each other via a data bus 22.

The camera unit/image capturing device 16 comprises a camera control 17, an image sensor 18, a display 19, and a lens assembly 20. As is well known in the art, the components of the camera unit 16 are used to capture an image. An image captured by the camera unit 16 is stored to the memory 12 as an image file 14. The image processing module 26 is configured to receive a captured image (as an image file) and processes the image using methods described herein. The image processing module 26 may include a contrast increasing mechanism, a gamma changing mechanism, a local gain adjustment mechanism, and/or a background subtraction mechanism. Each of these image adjustment mechanisms may result in a substantial separation or removal of unwanted background information from the captured digital image. The mobile communication processor 24 may be used to receive the processed image from the image processing module 26 and transmit the processed image to a recipient, to a remote server, or to a remote website via a wireless connection.

Figure 2:
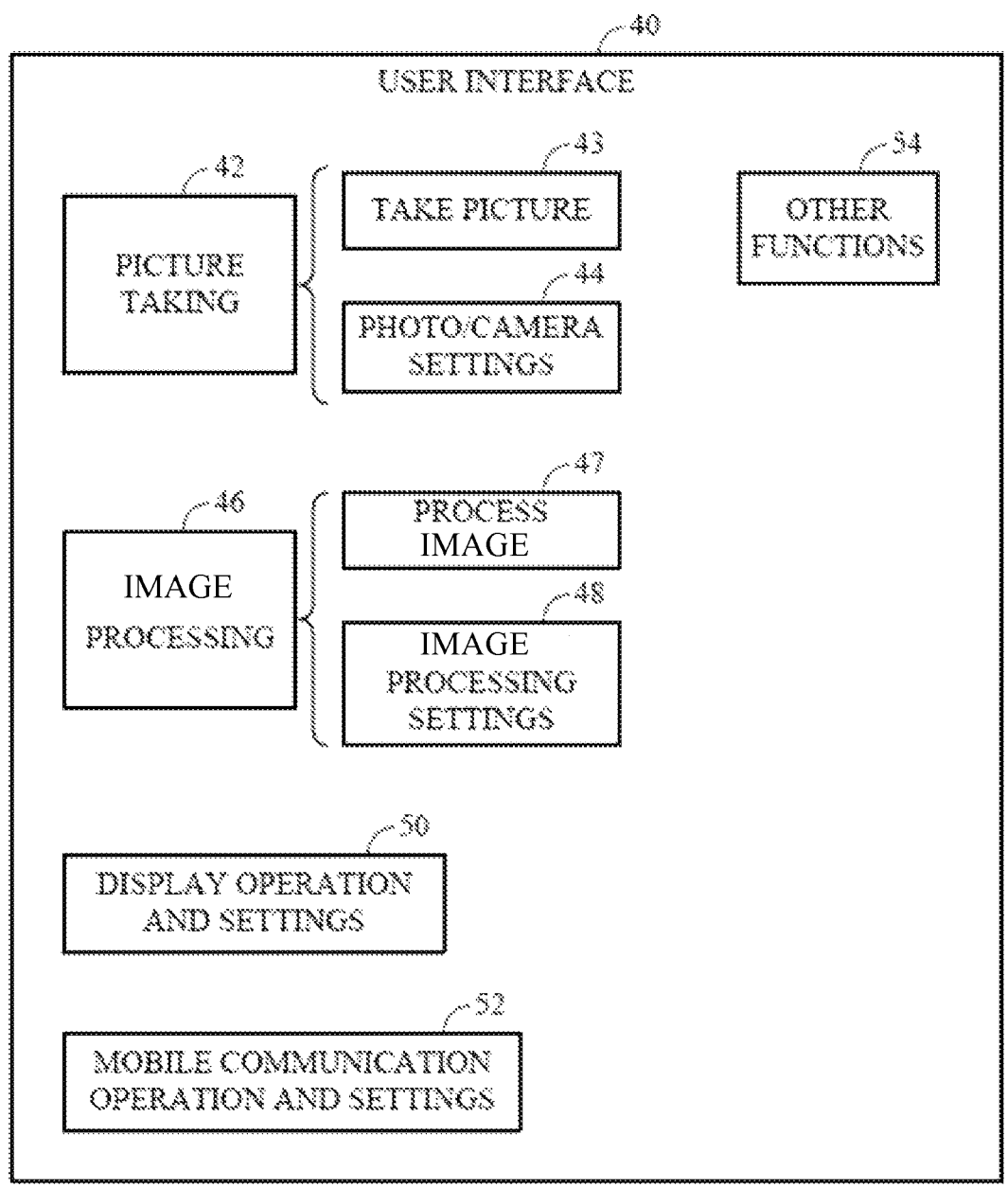
FIG. 2 is a conceptual diagram of a user interface of the embedded device shown in FIG. 1.

FIG. 2 is a conceptual diagram of a user interface 40 of the embedded device 10 shown in FIG. 1. The user interface 40 includes a picture taking interface 42, an image processing interface 46, and a display operation and settings interface 50. In addition, the user interface 40 may include a mobile communication operation and settings interface 52 and other functions interface 54. The picture taking interface 42 allows a user to take a picture 43 and adjust photograph and camera settings 44. The image processing interface 46 allow the user to process a captured image 47 and to define image processing settings 48.

Each of the interfaces may include, for example, a display or notification mechanism for communicating information to the user. For example, sound, light, or displayed text or image information may be used to present the user with certain information concerning the interface function and the status of the embedded device pertaining to that function. In addition, each of the interfaces may include an input or an activation mechanism for activating a particular function of the device (such as image processing) or for inputting information into the device, for example, to change settings of one or more functions of the device.

Figure 3:
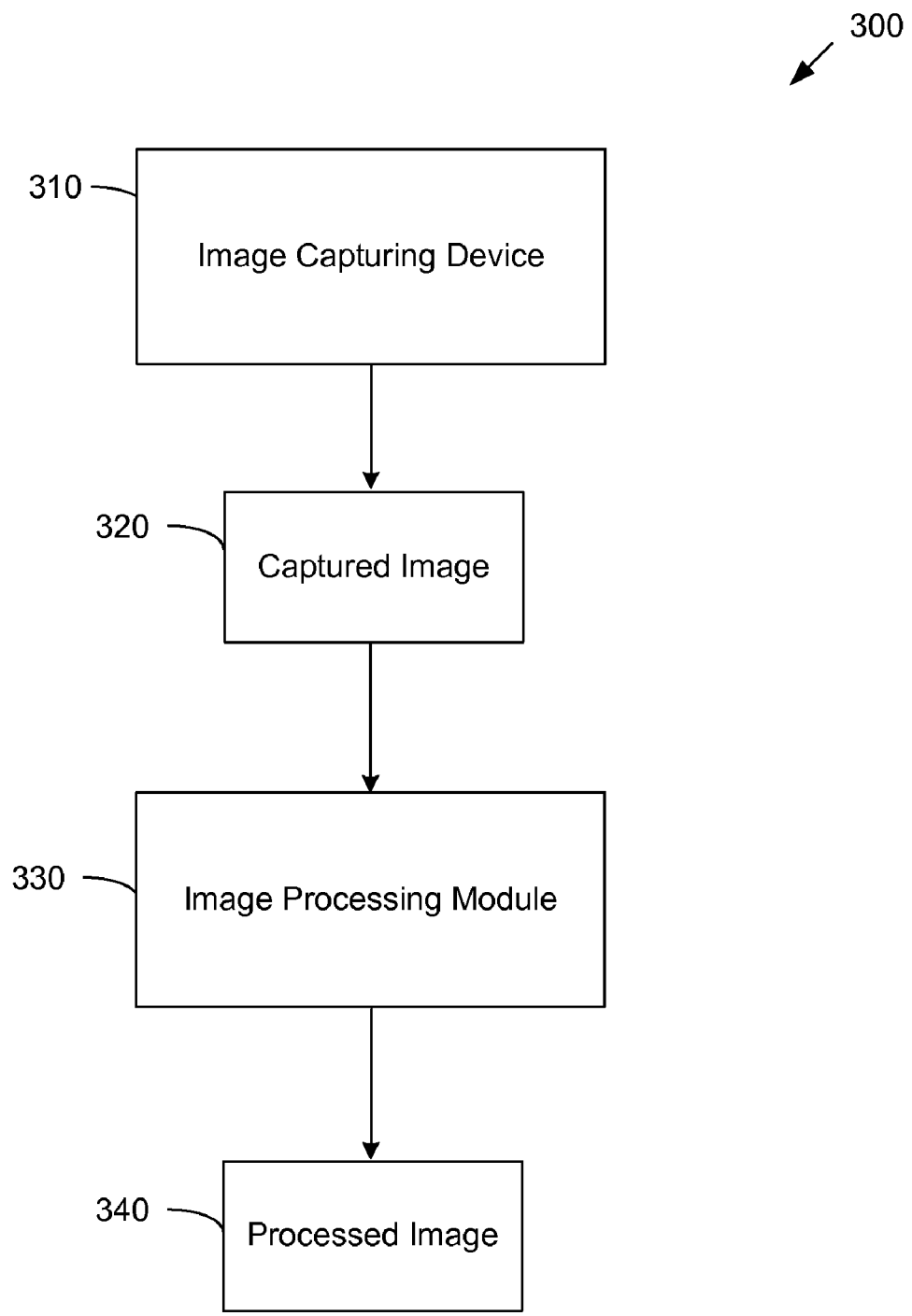
FIG. 3 shows an environment in which some embodiments operate.

FIG. 3 shows an environment 300 in which some embodiments operate. The environment 300 comprises an image capturing device 310, a captured image 320, an image processing module 330, and a processed image 340.

The image capturing device 310 comprises any device capable of capturing a digital image. In some embodiments, the image capturing device 310 comprises a camera, mobile communications device with a camera, a personal data assistant (PDA) with a camera, or any other device with a camera. In other embodiments, the image capturing device 310 comprises a document facsimile reading apparatus, a photocopy machine, a business card reader, a bar code scanner, a document scanner, or the like.

The image capturing device 310 produces the captured image 320. In some embodiments, the image 320 comprises an image of a whiteboard, blackboard, any other board of a different color, or any other type of structure. In other embodiments, the image 320 comprises an image of a document of any color (e.g., black or white). Examples of a document are a sheet of paper, a business card, or any other type of printable or readable medium. In further embodiments, the image 320 comprises an image of any type of medium having content written, drawn, printed, or otherwise displayed on it. In additional embodiments, the image 320 comprises an image of something else. The image 320 is stored on a memory that may be internal or external to the image capturing device 310.

Figure 4:
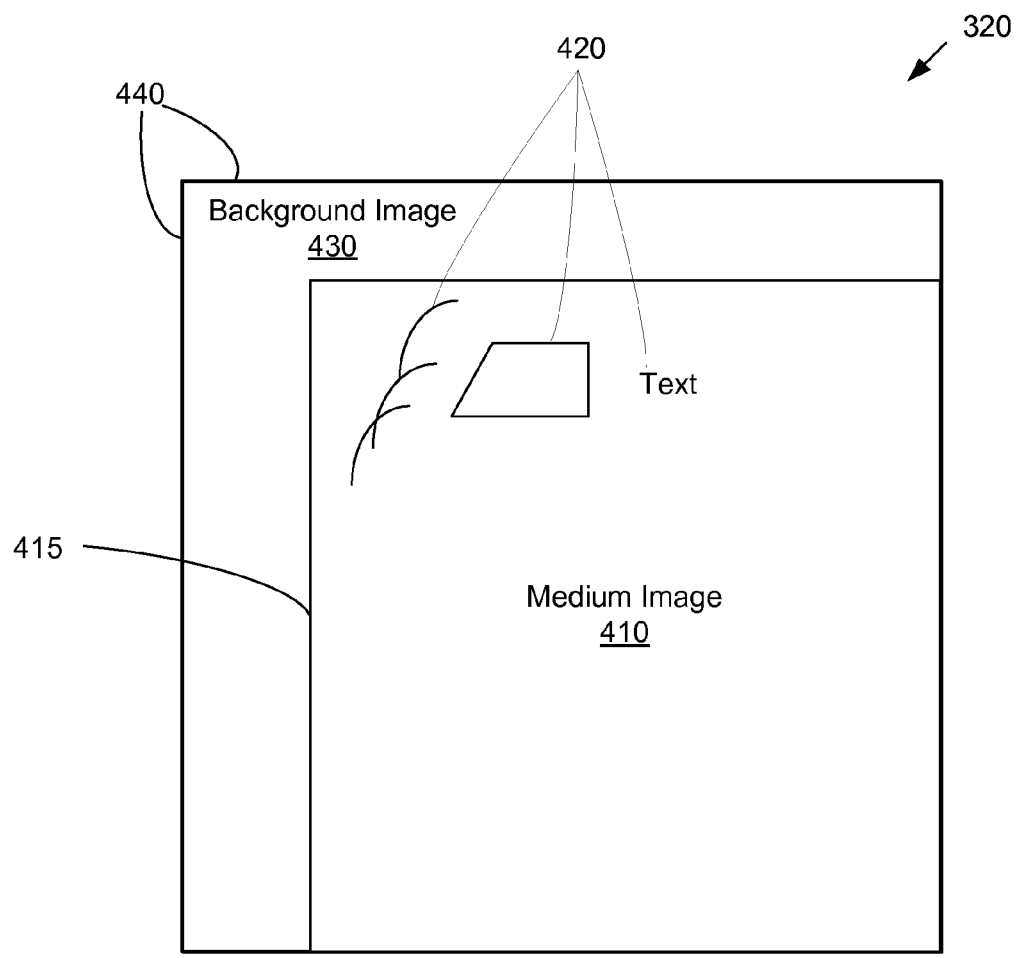
FIG. 4 shows an example of a typical captured image.

An example of a typical captured image 320 is shown in FIG. 4. As shown in FIG. 4, a typical captured image 320 comprises an image of a medium 410 (e.g., whiteboard, blackboard, document, etc.), an image of content 420 (e.g., text, lines, drawings, sketches, etc.) on the medium, and an image of a background 430 surrounding the medium. Note that the content 420 may be located inside the boundaries 415 of the medium 410 and the background 430 may be located outside of the boundaries 415 of the medium 410 and extends to the border 440 of the captured image 320.

As used herein, the term "medium image" sometimes refers to the image of the medium only, without the image of the content or background (i.e., the image of the medium as it would appear by itself). As used herein, the term "content image" sometimes refers to the image of the content only, without the image of the medium or background (i.e., the image of the content as it would appear by itself). The content comprises anything written, drawn, printed, or otherwise displayed on the medium. As used herein, the term "background image" sometimes refers to the image of the background only, without the image of the medium or content (i.e., the image of the background as it would appear by itself).

An image generally comprises a pattern/array of pixels where each pixel includes one or more different color components with the intensity of each color component being represented, for example, in terms of a numerical value. The image processing described herein may be performed on an image in different color spaces, for example, the (Y,Cb,Cr) or the (R,G,B) color space. Since images are often stored in JPEG format, and for the purposes of discussion and clarity, some embodiments are described using the (Y,Cb,Cr) color space where processing is generally performed using the Luma (Y) channel. In other embodiments, the image processing steps may be applied to an image having any other format or any other color space.

Referring back to FIG. 3, the image processing module 330 receives the captured image 320 from the image capturing device 310 and produces a processed image 340. The image processing module 330 processes the captured image 320 using methods described herein to increase the visibility and readability of the contents and/or remove the background in the captured image 320. In some embodiments, the image capturing device 310 and the image processing module 330 are implemented on a same device. In other embodiments, the image capturing device 310 and the image processing module 330 are implemented on separate devices.

II. Image Enhancement Processing

Typically, a captured image has several issues that affect the visibility of the content in the image. For example, due to illumination and lens non-uniformity, the image of the medium will typically have non-uniform illumination intensity across the medium (which in turn affects the visibility of the content on the medium). For example, if the medium is a whiteboard and a flash is used in capturing an image of the whiteboard, some parts of the resulting whiteboard image may be brighter (where the flash reflects against the whiteboard) and other parts may be darker. Also, the image of the content on the medium may typically have a dimmed illumination intensity (that decreases its visibility) relative to the actual appearance of the content on the medium.

Figure 5:
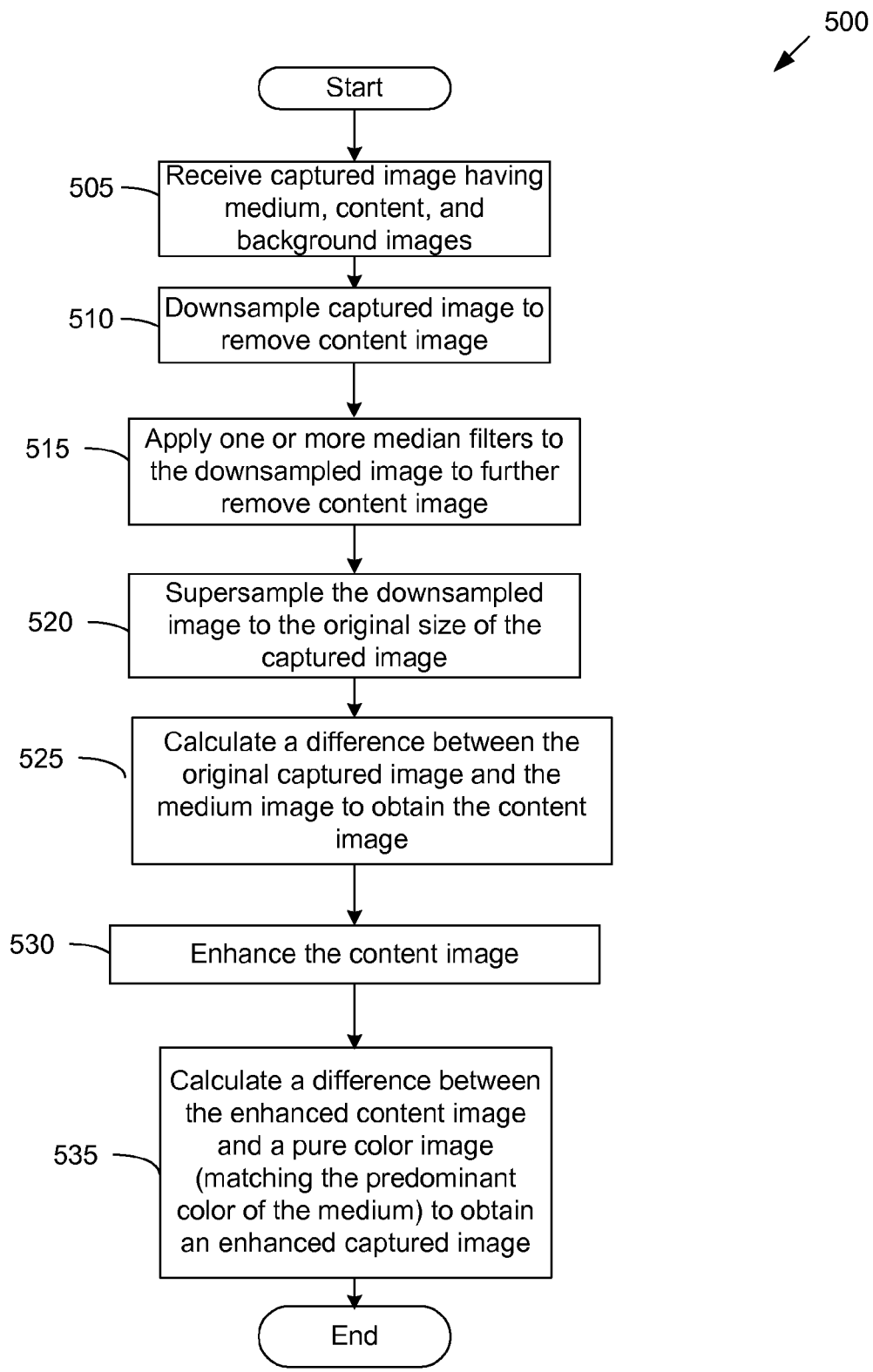
FIG. 5 is a flow chart of a method for producing an enhanced captured image.

In some embodiments, an image enhancement processing step is used to improve the visibility of the content image by recovering the original appearance of the medium (by changing the medium image to have a consistent illumination intensity) and enhancing the appearance of the content image. FIG. 5 is a flow chart of a method 500 for producing an enhanced captured image. The method 500 may be implemented through software and/or hardware configured to implement the method. The method may be implemented on an image-capturing device or on a separate device that receives a captured image for processing. In the (Y,Cb,Cr) color space, the enhancement processing of the method 500 is performed primarily using the Y channel. In other embodiments of the method 500, a different number of steps and/or a different order of steps is used.

Figure 6:
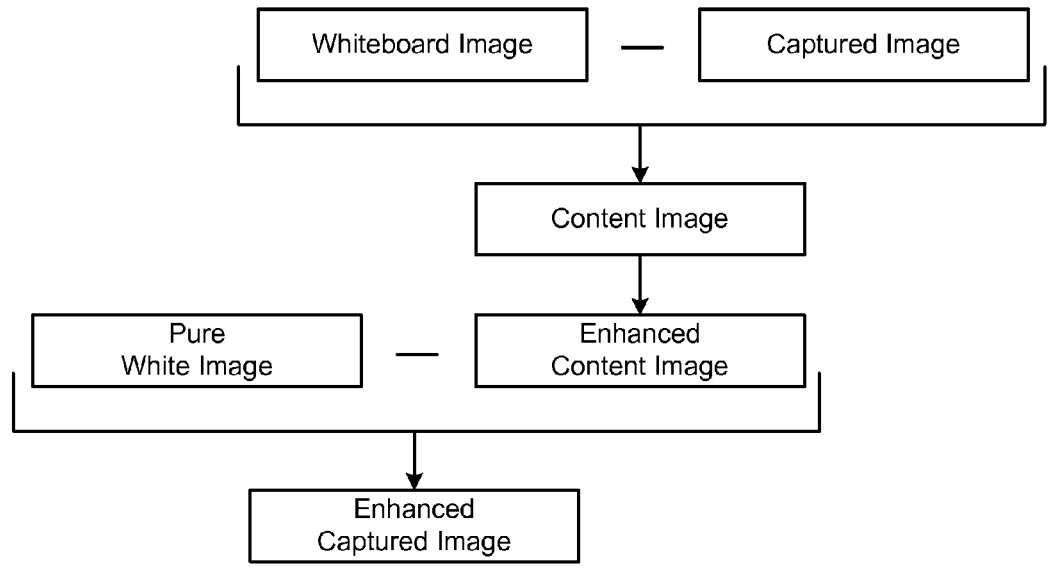
FIG. 6 shows a chart of the image enhancement steps for a captured image of a whiteboard.
Figure 7:
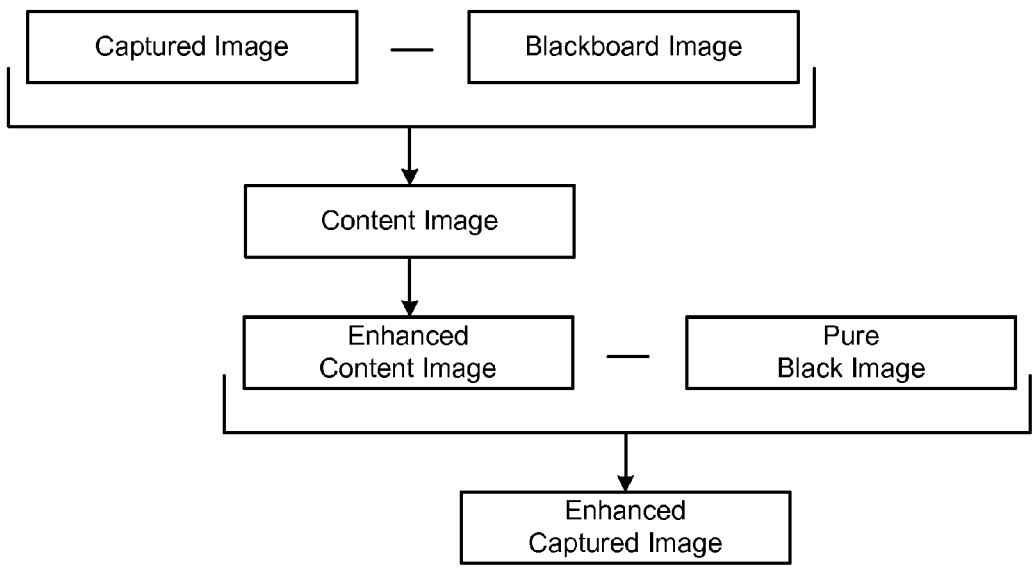
FIG. 7 shows a chart of the image enhancement steps for a captured image of a blackboard.

Generally, the method 500 first obtains the medium image from the captured image. The method may obtain the medium image by removing contents of the medium (e.g., through downsampling and use of a median filter or morphological operations such as "dilate" and "erode"). Once the medium image is obtained, the method may then obtain the content image by determining the difference between the original captured image and the medium image. The content image is then enhanced to improve the appearance of the content. After the content image is enhanced, an enhanced captured image may be obtained by calculating a difference between the enhanced content image and a pure color image (matching the predominant color of the medium). FIG. 6 shows a chart of the image enhancement processing steps for a captured image of a whiteboard. FIG. 7 shows a chart of the image enhancement processing steps for a captured image of a blackboard.

Figure 8:
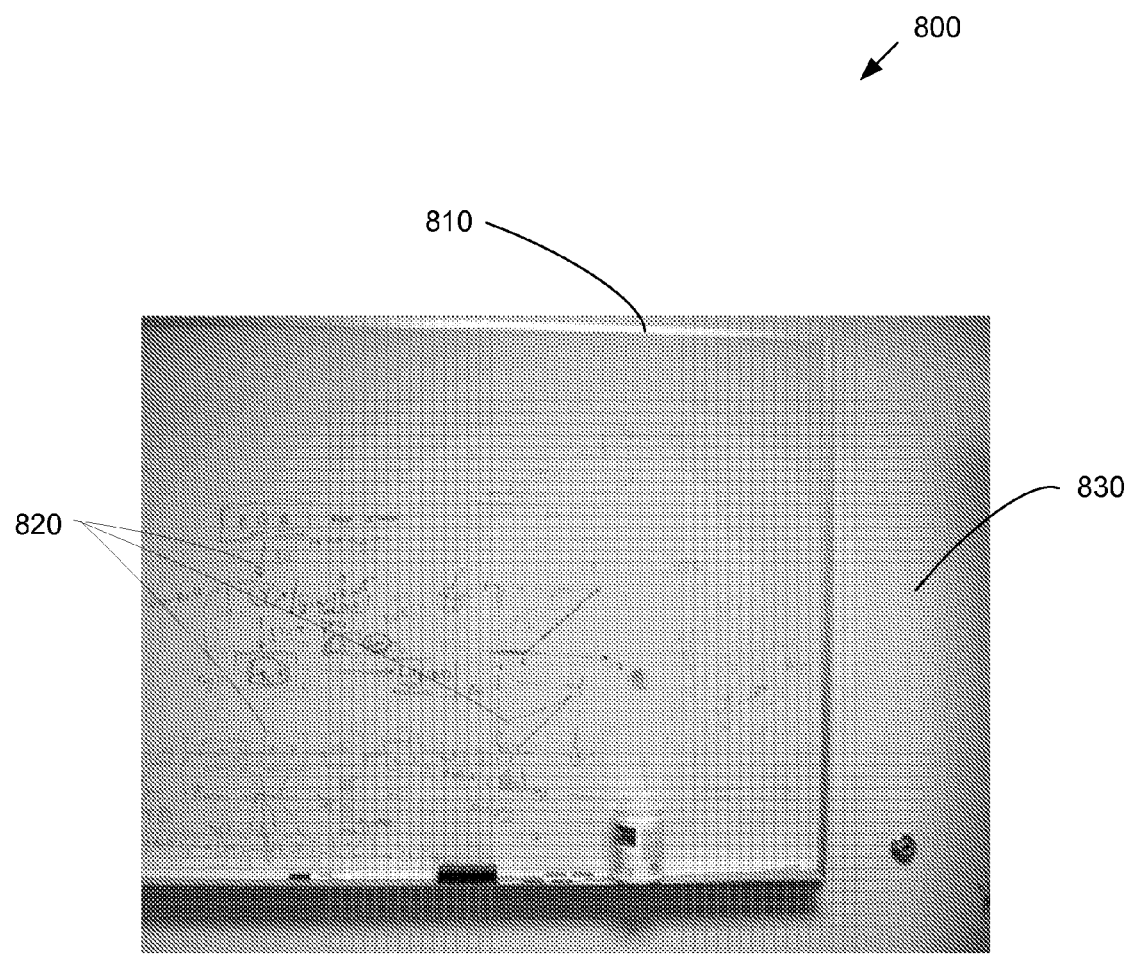
FIG. 8 shows an example of a captured image of a whiteboard having content and a background.

The method 500 begins when a captured image is received (at 505), the captured image comprising an image of a medium (e.g., whiteboard, blackboard, document, etc.), an image of content (e.g., text, lines, etc.) on the medium, and an image of a background surrounding the medium. An example of a captured image 800 of a whiteboard medium 810 having content 820 and a background 830 is shown in FIG. 8.

Figure 9:
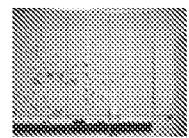
FIG. 9 shows an example of a downsized image of the captured image of FIG. 8.

The method then obtains the medium image by removing contents of the medium by subsampling/downsampling (at 510) the captured image and applying (at 515) one or more filters to the downsampled image. In some embodiments, at step 510, the captured image is downsampled at a high downsampling ratio. Content in the medium generally includes thin lines that cover a limited amount of pixels. By performing a high downsampling ratio, much of the content can be easily removed. In some embodiments, a downsampling ratio from 1/8 through 1/32 is used to downsize the captured image. In some embodiments, a downsampling ratio of 1/8 or lower is used to downsize the captured image. For example, for an image size with 1280×960 pixels, a downsampling ratio of 1/16 may be utilized to produce a downsized image with a size of 80×60 pixels (i.e., downsampling the size to 1/16 of the original). A "nearest neighbor" method may be used to perform the downsampling, or another interpolation method may be utilized. An example of a downsized image of the captured image of FIG. 8 is shown in FIG. 9.

Another benefit of using a high downsampling ratio is that subsequent filter processing (at step 515) with a small kernel can be used to effectively further remove content. For example, the kernel may be as small as 3×3 (i.e., a matrix size having a width of 3 pixels and a height of 3 pixels). In some embodiments, filter processing uses a kernel of 3×3 or larger. In some embodiments, filter processing uses a kernel having a size from 3×3 through 5×5. In addition, because the downsized image is smaller, the cost (i.e., processing memory needs) of the subsequent filtering processing is reduced.

Although downsizing removes much of the content in the captured image, there may still be content remaining. In some embodiments, at step 515, a median filter is applied to the downsized image to further remove content from the image. A median filter is useful here since the remaining content is typically "salt and pepper" noise which can be easily removed by a median filter. Also, a median filter keeps border edges less smoothed. The median or smoothing filter may be applied one or more times to more thoroughly remove content to obtain the medium image. In other embodiments, at step 515, a smoothing filter is applied to the downsized image to further remove content. In some embodiments, a simple 3×3 median and/or smoothing filter is applied to the downsized image to further remove content.

The downsampling and filtering provides substantial removal of the content image. Downsampling and filtering of the image can be performed with multi-scaling steps to improve the results. In other embodiments, however, other methods are used to remove the content from the image. In some embodiments, a morphological operation (such as "dilate" and "erode") is used to remove content. In further embodiments, any combination of methods (e.g., applying a median filter, applying a smoothing filter, using morphological operation, etc.) may be used to remove content.

Figure 10:
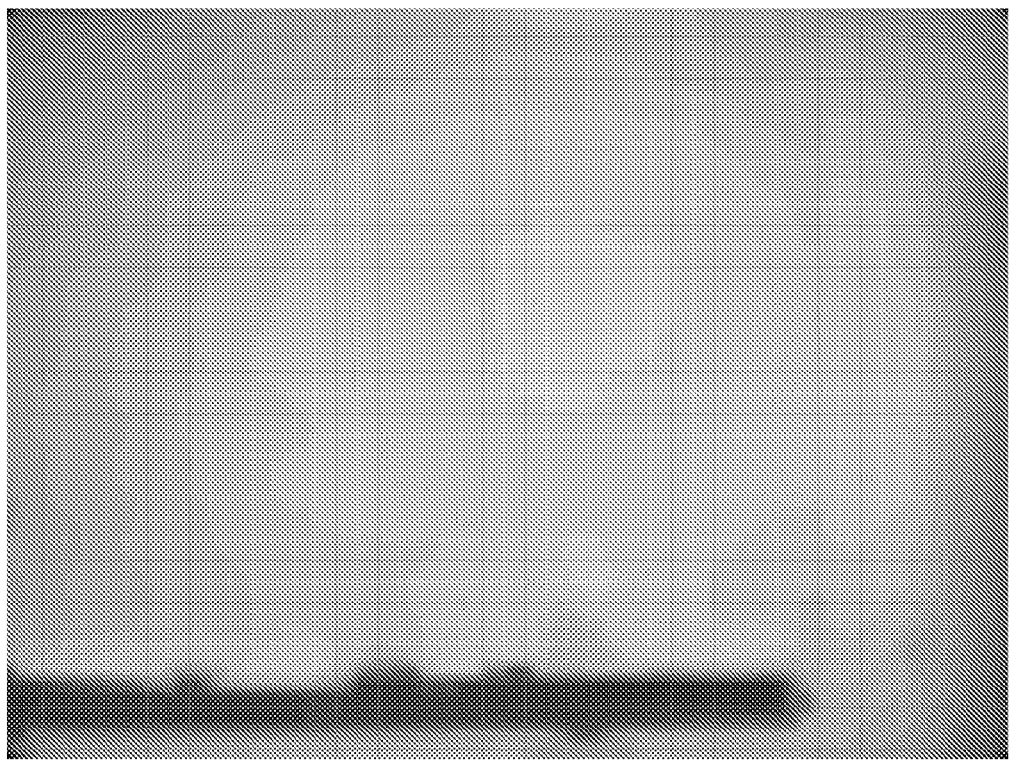
FIG. 10 shows an example of the whiteboard image of the captured image of FIG. 8.

After content is removed from the image (at 510 and 515), a downsized medium image has now been obtained. To have an image that corresponds to the original sample resolution of the original captured image, the downsized image is supersampled/upsized (at 520) to the original resolution. In some embodiments, a high supersamling/upsizing ratio is used that is determined by the downsampling ratio used to initially downsize the image. For example, if the original image was downsized by 1/16, the supersamling ratio would be 16 to return the size to the original size. A bilinear interpolation method may be used to supersample the downsized image to obtain a smooth interpolation. In other embodiments, other interpolation methods are used (e.g., bicubic, spline, or other types of smoothing interpolation methods). After step 520, the medium image (without content and at its original resolution) has been obtained. An example of the medium image (whiteboard image) of the captured image of FIG. 8 is shown in FIG. 10.

Figure 11:
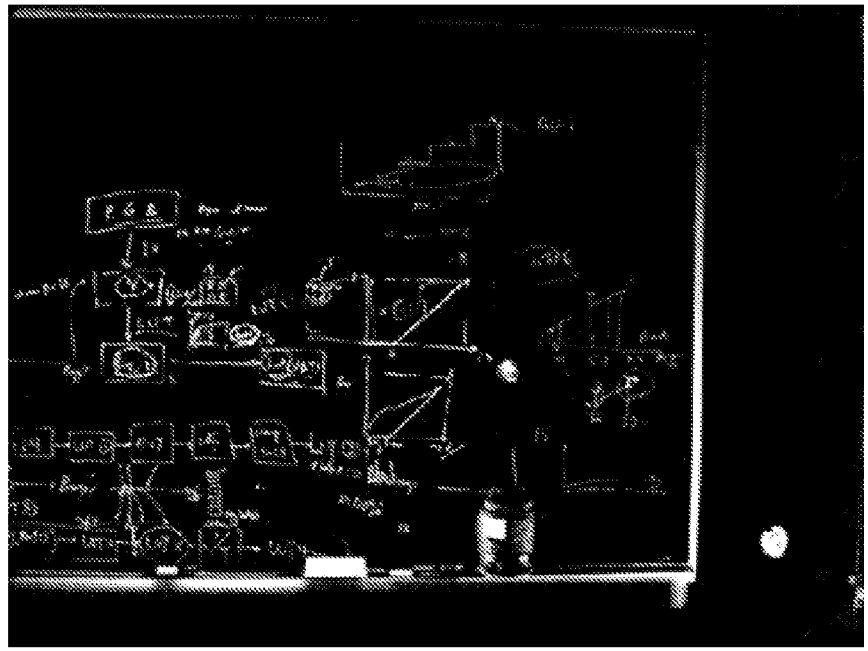
FIG. 11 shows an example of the content image of the captured image of FIG. 8.

The method then obtains/extracts the content image from the original captured image by calculating (at 525) a difference between the original captured image and the medium image. For example, the method 500 may do so by determining pixel value differences between corresponding pixels of the original captured image and the medium image. For a captured image of a whiteboard, the original captured image is subtracted from the medium image (whiteboard image) to produce the content image (as shown in FIG. 6). For a captured image of a blackboard, the medium image (blackboard image) is subtracted from the original captured image to produce the content image (as shown in FIG. 7). An example of the content image of the captured image of FIG. 8 is shown in FIG. 11.

After the content image is obtained, the content image is enhanced (at 530). The method may do so, for example, through ratio multiplication of the Y channel of the content image (i.e., amplifying the Y channel of the content image). The ratio can be determined by a user, for example, using an image processing interface 46, as shown in FIG. 2. In some embodiments, the ratio is between two and five. Note that the content image may include noise that is extracted along with the content. As such, when enhancing the content image, a threshold pixel value may be applied to the content image so that pixels having a value below the threshold are treated as noise and will not be amplified/enhanced through ratio multiplication.

For the color channels of the content image, in order to keep the hue of the content image unchanged, the ratio between Cb and Cr channels may be kept the same. To obtain brilliant and vivid colors, however, the saturation of these channels may be enhanced/amplified through ratio multiplication. In some embodiments, the content image is enhanced (at 530) through ratio multiplication of the Cb and Cr channels of the content image to enhance the color saturation of the content image (e.g., by multiplying the Cb and Cr channels with the same or a different amplification ratio as done for the Y channel).

After the content image is enhanced, the method 500 obtains an enhanced captured image by calculating (at 535) a difference between the enhanced content image and a pure color image (matching the predominant color of the medium), e.g., by determining pixel value differences between corresponding pixels of the enhanced content image and a pure color image. For example, for a captured image of a whiteboard or light-colored document, the pure color image may comprise a pure white or light image of the same size as the original captured image, each pixel having a high or maximum lightness value. In contrast, for a captured image of a blackboard or dark-colored document, the pure color image may comprise a pure black or dark image of the same size as the original captured image, each pixel having a low or minimum lightness value. For a captured image of a whiteboard, the enhanced content image is subtracted from a pure white image to produce the enhanced captured image (as shown in FIG. 6). For a captured image of a blackboard, a pure black image is subtracted from the enhanced content image to produce the enhanced captured image (as shown in FIG. 7). The method 500 then ends.

Figure 12:
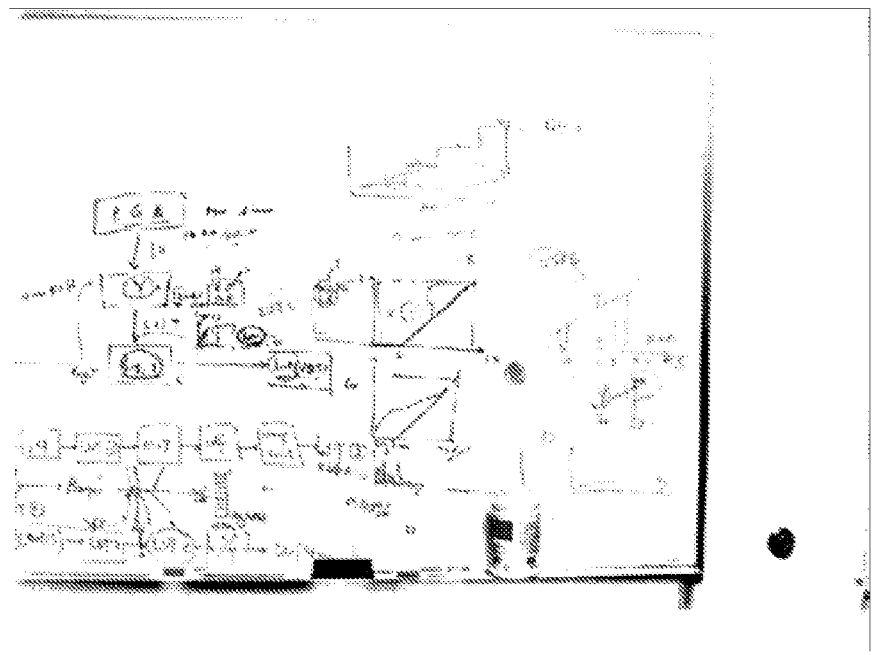
FIG. 12 shows an example of the enhanced captured image of the original captured image shown in FIG. 8.
Figure 13:
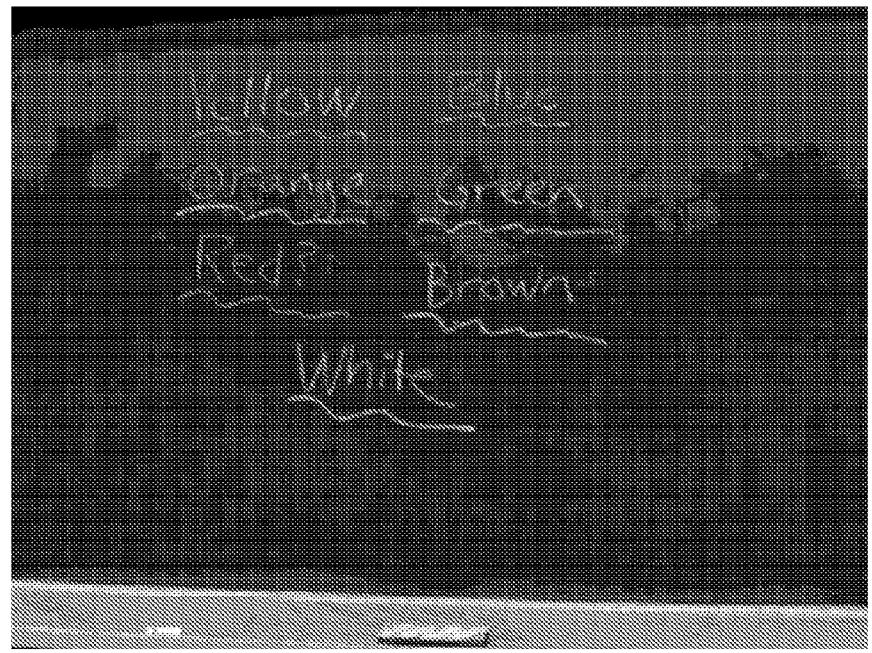
FIG. 13 shows an example of a captured image of a blackboard.
Figure 14:
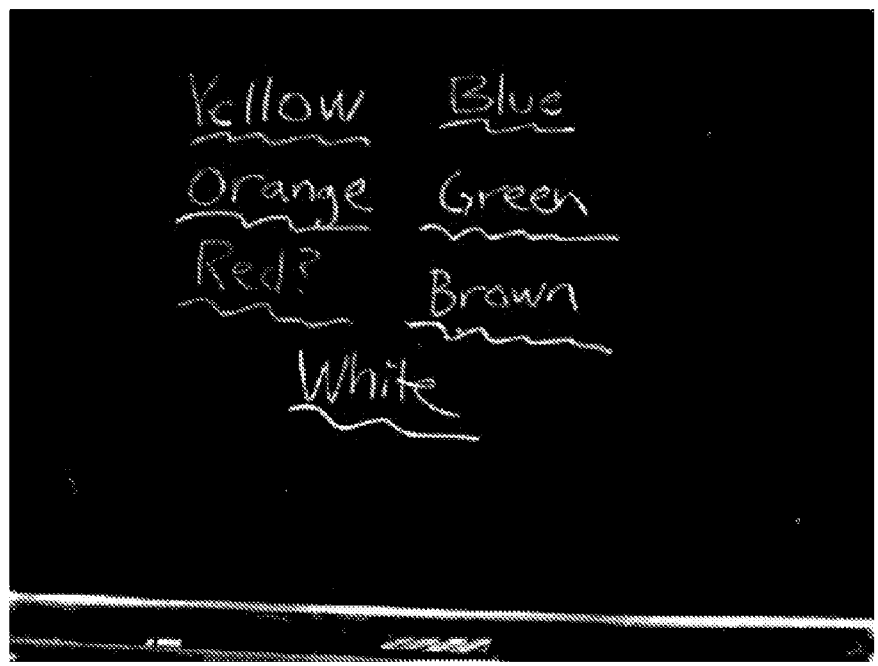
FIG. 14 shows an example of the enhanced captured image of the captured image of FIG. 13.

FIG. 12 shows an example of the enhanced captured image of the original captured image of a whiteboard shown in FIG. 8. An example of a captured image of a blackboard is shown in FIG. 13 and an example of the enhanced captured image of the blackboard is shown in FIG. 14. In comparison to the original captured image, the enhanced captured image has a medium image (whiteboard or blackboard image) of consistent illumination intensity and an enhanced content image for improved visibility of the content image.

III. Removing the Background Image Using Medium Boundary Detection

In some embodiments, the boundary of the medium image in the captured image is determined to remove the background image and retain the content image. As defined above, the content image is located inside the boundaries of the medium image and the background image is located outside of the boundaries of the medium image and extends to the border of the captured image. As the content image contains the substance of the captured image (e.g., text, sketches, etc.), the background image is unnecessary and may be removed, for example, to reduce the visual clutter of the captured image and the storage size required to store the captured image.

Figure 15:
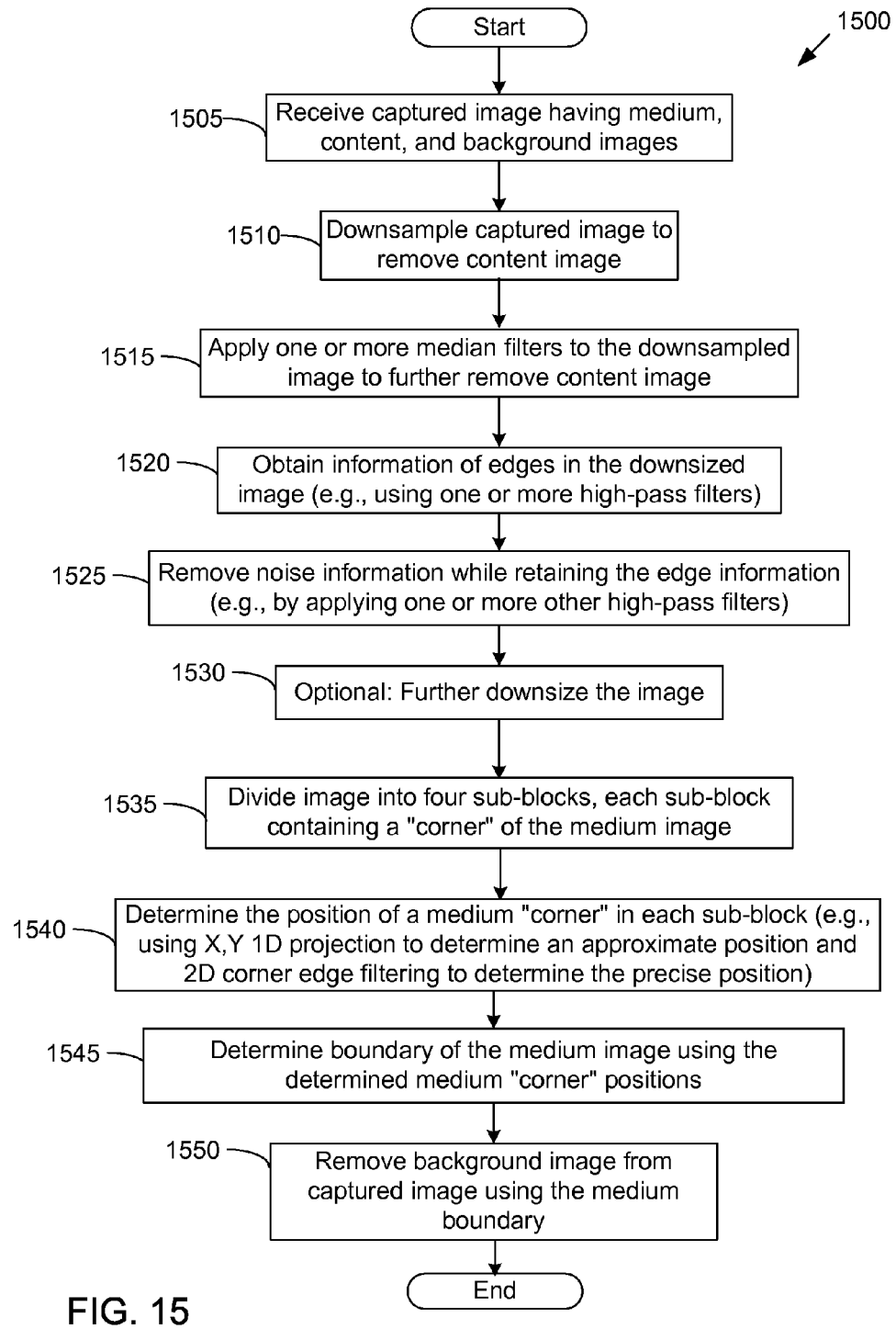
FIG. 15 shows a flowchart of a method for removing the background image of a captured image by detecting the boundary of the medium image.

FIG. 15 shows a flowchart of a method 1500 for removing the background image of a captured image by detecting the boundary of the medium image. The method 1500 may be implemented through software and/or hardware configured to implement the method. The method may be implemented on an image-capturing device or on a separate device that receives a captured image for processing. In the (Y,Cb,Cr) color space, the enhancement processing of the method 1500 is performed primarily using the Luma (Y) channel. In other embodiments of the method 1500, a different number of steps and/or a different order of steps is used.

Generally, the method 1500 first removes the content from the captured image (e.g., through downsampling and use of a median filter or morphological operations such as "dilate" and "erode"). The method may then obtain edge information of any edges contained in the captured image (e.g., through use of one or more high-pass filters). To reduce the amount of required calculations, the method may then further downsize the captured image. The method then divides the resulting image into four sub-blocks and determines the position of a medium "corner" in each sub-block, for example, using one-dimensional (1D) projection and two-dimensional (2D) corner edge filtering. The method then determines the boundary of the medium image using the determined medium "corner" positions and removes the background image using the medium boundary.

Figure 16:
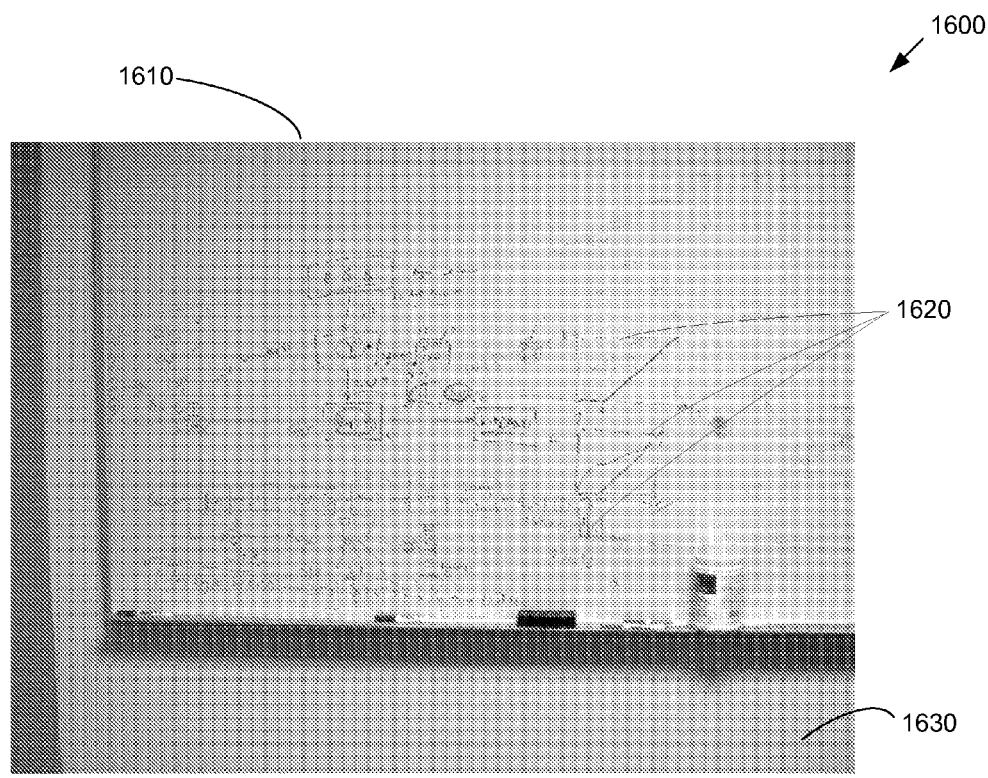
FIG. 16 shows an example of a captured image of a whiteboard having content and a background.

The method 1500 begins when a captured image is received (at 1505), the captured image comprising an image of a medium, an image of content on the medium, and an image of a background surrounding the medium. In some embodiments, the captured image is an enhanced captured image (e.g., as produced by the image enhancement method 500 shown in FIG. 5). In other embodiments, the captured image is not an enhanced captured image. An example of a captured image 1600 of a whiteboard medium 1610 having content 1620 and a background 1630 is shown in FIG. 16.

Figure 17:
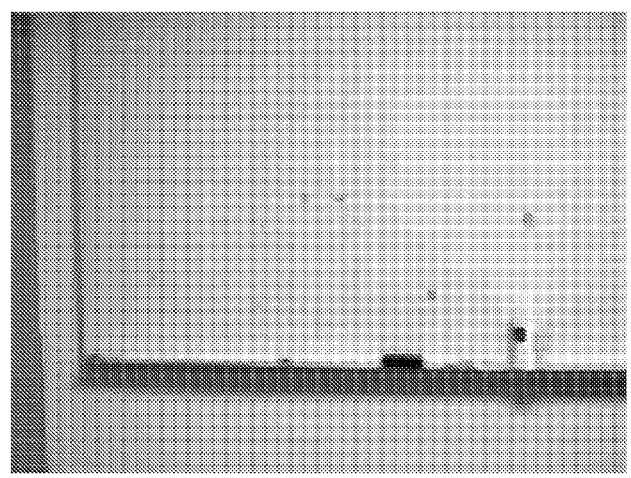
FIG. 17 shows an example of a downsized image of the captured image of FIG. 16.

The method then removes the contents of the captured image by downsampling (at 1510) the captured image and applying (at 1515) one or more filters to the downsampled image. The downsampling and filtering steps of 1510 and 1515 are similar to steps 510 and 515 of FIG. 5 and are not described in detail here. In other embodiments, other methods are used to remove the content from the image (e.g., a morphological operation or any combination of methods, as discussed above in relation to FIG. 5). An example of a downsized and filtered image of the image of FIG. 16 is shown in FIG. 17. As shown in FIG. 17, most of the content is removed after the downsizing and filtering steps.

After content is removed from the image (at 1510 and 1515), the method then obtains (at 1520) information (edge information) of images of any edges (e.g., lines, segments, etc.) contained in the downsized image. In some embodiments, a first set of one or more high-pass filters is applied to the downsized image to obtain the edge information. In some embodiments, the one or more high-pass filters comprise a vertical and a horizontal 3×3 high-pass filter. In some embodiments, the vertical high-pass filter is represented by the array:

$$\begin{bmatrix} -1 & -1 & -1 \\ 0.5 & 0.5 & 0.5 \\ 0.5 & 0.5 & 0.5 \end{bmatrix}.$$

In some embodiments, the horizontal high-pass filter is represented by the array:

$$\begin{bmatrix} -1 & 0.5 & 0.5 \\ -1 & 0.5 & 0.5 \\ -1 & 0.5 & 0.5 \end{bmatrix}.$$

Figure 18:
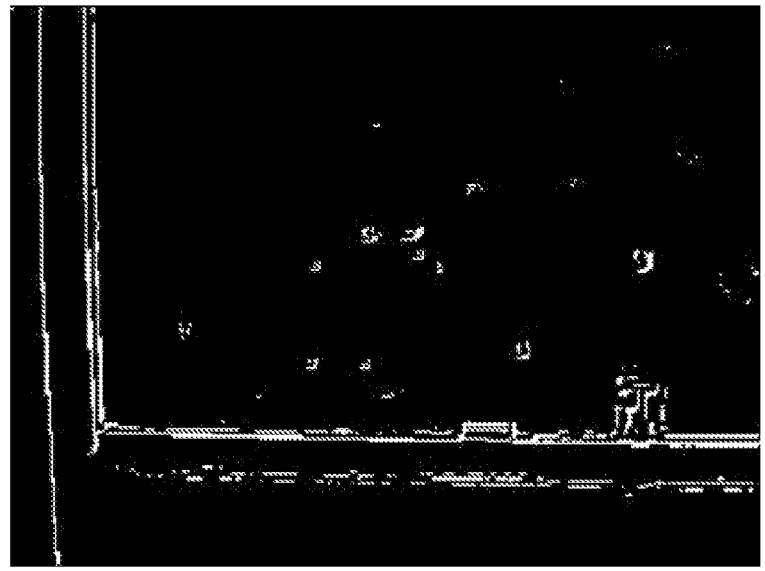
FIG. 18 shows an example of a high-pass filtered image of the downsized image of FIG. 17.
Figure 19:
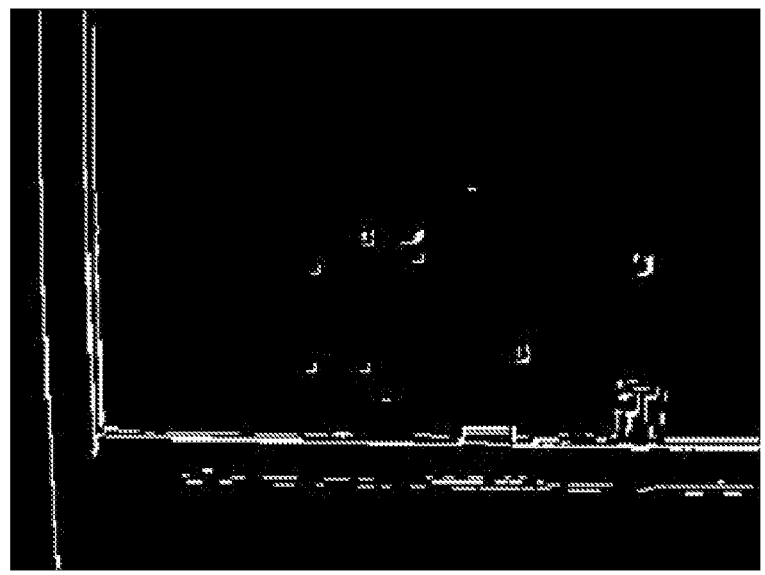
FIG. 19 shows an example of the image of FIG. 18 after a second high-pass filter application.

As well known in the art, the above arrays represent 3×3 2D filter coefficients. For example, the 2D filter output pixel at position (i, j) is:

for (m=−1; m<2; m++)
   for (n=−1; n<2; n++)
      Out[i, j]+=filter[m+1, n+1]*inputPixel[i+m, j+n]
      filter[0, 0]=−1 in the vertical HPF and horizontal HPF,
      filter[0, 1]=−1 in the vertical HPF and 0.5 in the horizontal HPF An example of a high-pass filtered image (HPF image) of the image of FIG. 17 is shown in FIG. 18. Notice that the HPF image contains noise (e.g., isolated short edges, dots, etc.). In some embodiments, the method then removes (at 1525) noise information from the HPF image while retaining the edge information. In some embodiments, the method does so by applying a second set of one or more high-pass filters to the HPF image. FIG. 19 shows an example of the image of FIG. 18 after the second HPF application is performed. Note that in comparison to FIG. 18, the white board and wall edges are retained while most of the noise has been removed in FIG. 19.

The pseudo code for the high-pass filter operations performed at steps 1520 and 1525 is:

```
edgeVertical = filter(image_Y_downSized_med, Vertical HPF);
edgeHorizontal = filter(image_Y_downSized_med, Horizontal HPF);
edge = abs(edgeVertical) + abs(edgeHorizontal);
2nd_hpf(x, y) = edge(x, y) − edge(x+1, y+1);
image_edge(x, y) = edge(x, y) > 0.1 AND 2nd_hpf(x, y) > 0.1;
```

To reduce the amount of required calculations for the medium boundary search (discussed below), the method may optionally further downsize (at 1530) the HPF image. For example, image may be downsampled again by a ratio of 1/16.

In some embodiments, the downsampling pseudo code is:

```
Sum(x, y) = 0;
For(i=x−2; i<x+2; i++)
    For(j=y−2; j<y+2; j++)
        Sum(x, y) = Sum(x, y) + image_edge(x, y);
If(Sum(x, y) > 0) downSample(x, y) = 1;
Else downSample(x, y) = 0;
x = x + 4;
y = y + 4;
```

Figure 20:
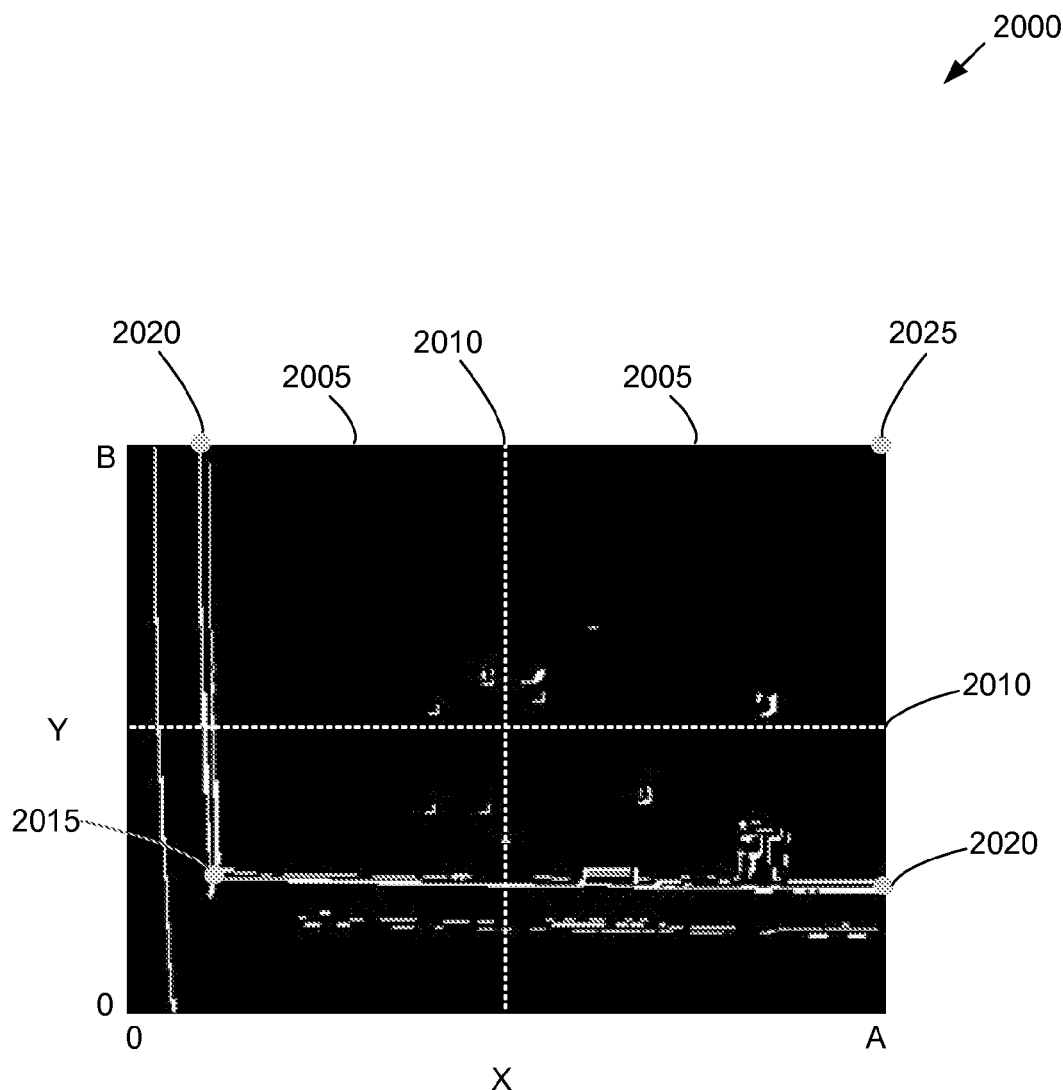
FIG. 20 shows the image of FIG. 19 partitioned into four sub-blocks.

The method then divides (at 1535) the HPF image into a plurality of sub-blocks. FIG. 20 shows the image 2000 of FIG. 19 partitioned into four equal-sized sub-blocks 2005 in accordance with some embodiments. As shown in FIG. 20, the image 2000 is divided using two partitioning lines 810 that intersect at the center of the image 2000. If it is assumed that the medium image (e.g., whiteboard image) is centered around the center of the captured image, if the captured image were divided into four equal-sized sub-blocks, it could also be assumed that each sub-block would contain a "corner" of the medium image. As used herein, in a sub-block, a "corner" of the medium image comprises a point of intersection 2015 between two edges of the medium image. If such a intersection point 2015 is not contained in a sub-block, a "corner" of the medium image a point of intersection 2020 between an edge of the medium image and the border of the image 2000. If neither such intersection points (2015 nor 2020) are contained in a sub-block, a "corner" of the medium image comprises the point of intersection 2025 between two borders of the image 2000 (i.e., the corner of the image 2000).

The method 1500 then determines (at 1540) the position of a medium "corner" in each sub-block. In some embodiments, the method does so using coarse and fine search steps. In some embodiments, the captured image has an X, Y coordinate system where the position of a medium "corner" in each sub-block may be expressed as X, Y coordinates of one or more pixels in the coordinate system. For example, as shown in FIG. 20, the image 2000 has an X axis showing pixel positions/coordinates from 0 to A and a Y axis showing pixel positions/coordinates from 0 to B, whereby the bottom left corner of the image 2000 has coordinates 0, 0.

In some embodiments, the method uses X and Y one-dimensional (1D) projection search schemes for coarse searching to determine the approximate positions of the medium "corner" in each sub-block. As is well known in the art, in a 1D projection in the X direction, the method scans/progresses from the lowest to the highest X coordinates in a sub-block to determine projection values for each X coordinate in the sub-block. A projection value at a particular X coordinate indicates the horizontal position of vertical edge. The pseudo code for a 1D projection in the X direction at position x is:

```
for(m=0; m<length_of_Y; m++)
    X_projection[x] += pixel[x, m].
```

Figure 21:
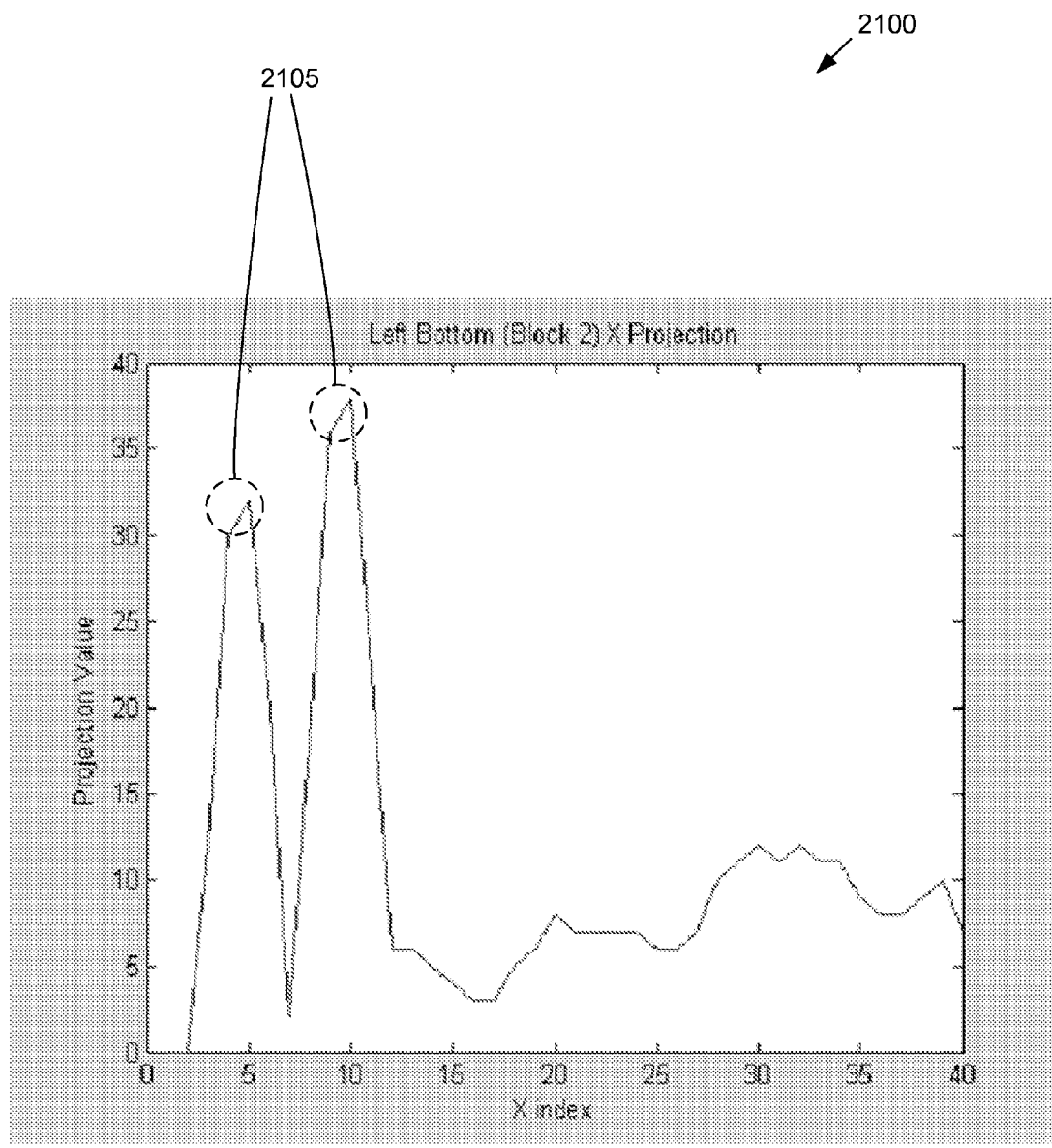
FIG. 21 shows an X projection graph for the bottom-left sub-block of the image of FIG. 20.

FIG. 21 shows an X projection graph 2100 of projection values as a function of X coordinates for the bottom-left sub-block of the image 2000 of FIG. 20.

As is well known in the art, in a 1D projection in the Y direction, the method scans/progresses from the lowest to the highest Y coordinates in a sub-block to determine projection values for each Y coordinate in the sub-block. A projection value at a particular Y coordinate indicates the vertical position of horizontal edge. The pseudo code for a 1D projection in the Y direction at position y is:

```
for(m=0; m<length_of_X; m++)
    Y_projection[y] += pixel[m, y].
```

Figure 22:
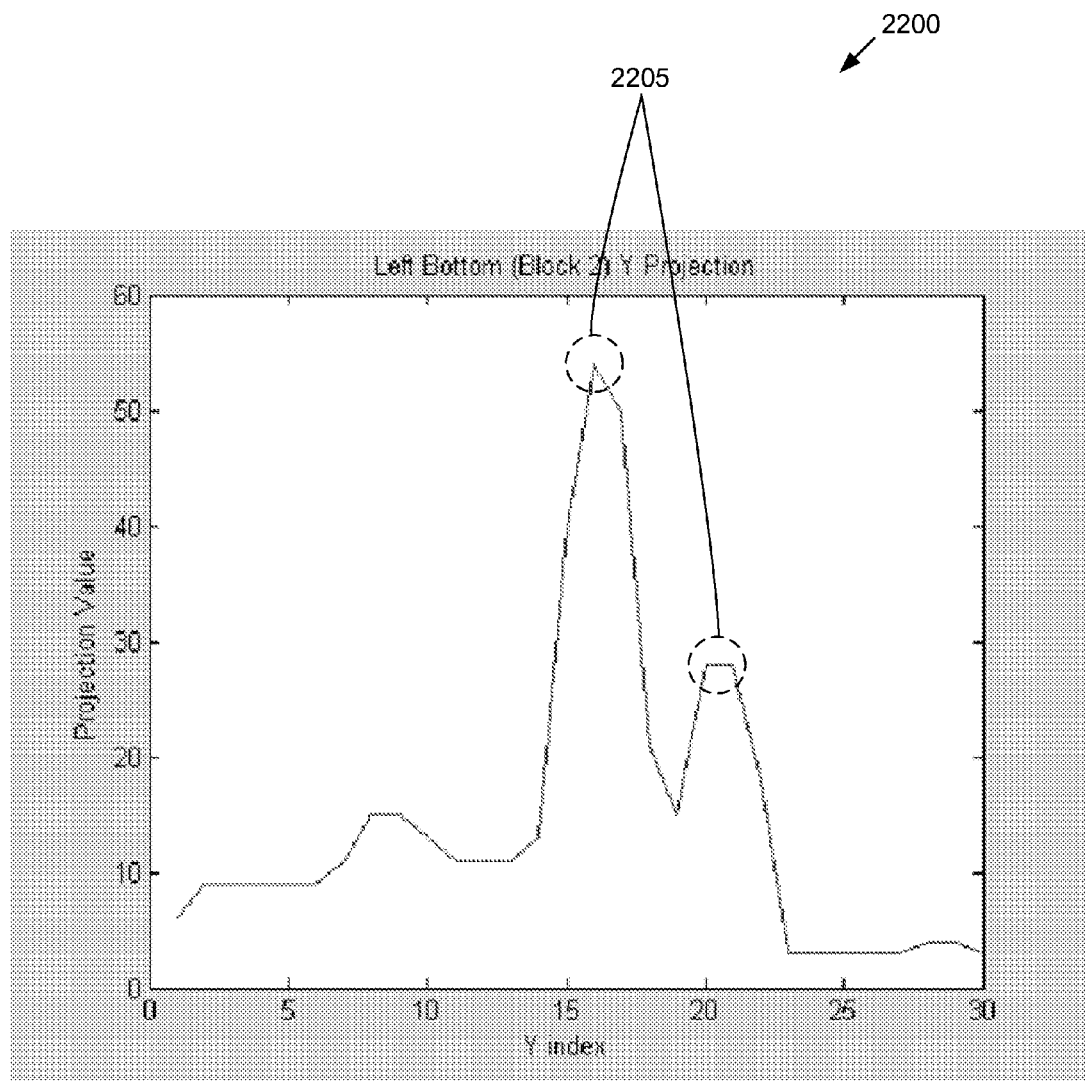
FIG. 22 shows a Y projection graph for the bottom-left sub-block of the image of FIG. 20.

FIG. 22 shows a Y projection graph 2200 of projection values as a function of Y coordinates for the bottom-left sub-block of the image 2000 of FIG. 20.

Peaks 2105 of the X projection graph 2100 indicate images of vertical edges in the sub-block that may or may not be part of the medium image boundary. Therefore, it is possible that there is a medium "corner" in the sub-block having an X coordinate that is approximate to (in the neighborhood of) an X coordinate of a peak in the X projection graph. Peaks 2205 of the Y projection graph 2200 indicate images of horizontal edges that may or may not be part of the medium image boundary. Therefore, it is possible that there is a medium "corner" in the sub-block having a Y coordinate that is approximate to (in the neighborhood of) a Y coordinate of a peak in the Y projection graph.

As such, the peaks 2105 and 2205 of the projection graphs 2100 and 2200 provide approximate X and Y coordinates of the medium "corner" in a sub-block and supply an approximate position in the sub-block for fine searching of the medium "corner." In some embodiments, a peak 2105 or 2205 must have a projection value exceeding a predetermined threshold value to be considered an approximate X or Y coordinate for fine searching of the medium "corner."

Note that an X projection graph 2100 may not contain a projection peak 2105 indicating that no images of vertical edges are found in the sub-block. For example, in FIG. 20, X projection graphs 2100 of the top-right sub-block and the lower-right sub-block would not contain a projection peak 2105 since no images of vertical edges are found in those sub-blocks. Where no peaks are found, the approximate X coordinate of the medium "corner" in the sub-block would be set to 0 if the sub-block contains the X coordinate of 0 or set to the maximum X coordinate of the image if the sub-block contains the maximum X coordinate. For example, the approximate X coordinate of the medium "corner" in the top-right and lower-right sub-blocks of FIG. 20 would be set to the maximum X coordinate (A) since both sub-blocks contain this maximum X coordinate.

Similarly, an Y projection graph 2200 may not contain a projection peak 2205 indicating that no images of horizontal edges are found in the sub-block. For example, in FIG. 20, Y projection graphs 2200 of the top-left and top-right sub-blocks would not contain a projection peak 2205 since no images of horizontal edges are found in those sub-blocks. Where no peaks are found, the approximate Y coordinate of the medium "corner" in the sub-block would be set to 0 if the sub-block contains the Y coordinate of 0 or set to the maximum Y coordinate of the image if the sub-block contains the maximum Y coordinate. For example, the approximate Y coordinate of the medium "corner" in the top-left and top-right sub-blocks of FIG. 20 would be set to the maximum Y coordinate (B) since both sub-blocks contain this maximum Y coordinate.

Any approximate X or Y coordinates of a medium "corner" in a sub-block produced by the X, Y 1D projection provides an approximate position in the sub-block for fine searching of the medium "corner." Fine searching of a medium "corner" is performed in each sub-block to determine the specific/precise position (in terms of X, Y pixel coordinates) of the medium "corner." In some embodiments, two-dimensional (2D) corner edge filtering is used around the approximate position of the medium "corner" to determine the specific position of the medium "corner" in each sub-block.

In some embodiments, since the angle of a boundary corner in a sub-block can not be 90 degrees, a sliding window filter is used in combination with the X, Y 1D projections to provide robust performance. As discussed above, the pseudo code for a 1D projection in the X direction at position x is:

```
for(m=0; m<length_of_Y; m++)
    X_projection[x] += pixel[x, m].
```

The pseudo code for a 1D projection in the X direction at position x after applying a sliding filter having a sliding window size of 3 pixels is:

```
for(m=0; m<length_of_Y; m++)
    for(n=-1; n<2; n++)
        X_projection[x] += pixel[x+n, m].
```

As discussed above, the pseudo code for a 1D projection in the Y direction at position y is:

```
for(m=0; m<length_of_X; m++)
    Y_projection[y] += pixel[m, y].
```

The pseudo code for a 1D projection in the Y direction at position y after applying a sliding filter having a sliding window size of 3 pixels is:

```
for(m=0; m<length_of_X; m++)
    for(n=-1; n<2; n++)
        Y_projection[y] += pixel[y+n, m].
```

In some embodiments, a different 2D corner edge filter is applied to each sub-block of an image. In some embodiments, the 2D corner edge filters for the sub-blocks are represented by the following arrays:

Filter for top-left sub-block:

$$\begin{bmatrix} 1 & 1 & 1 \\ 1 & -1 & -1 \\ 1 & -1 & -1 \end{bmatrix}.$$

Filter for bottom-left sub-block:

$$\begin{bmatrix} 1 & -1 & -1 \\ 1 & -1 & -1 \\ 1 & 1 & 1 \end{bmatrix}.$$

Filter for top-right sub-block:

$$\begin{bmatrix} 1 & 1 & 1 \\ -1 & -1 & 1 \\ -1 & -1 & 1 \end{bmatrix}.$$

Filter for bottom-right sub-block:

$$\begin{bmatrix} -1 & -1 & 1 \\ -1 & -1 & 1 \\ 1 & 1 & 1 \end{bmatrix}.$$

A particular 3×3 2D filter for a particular sub-block is used to determine the specific position of a medium "corner" in the sub-block by applying the particular 2D filter to each 3×3 pixel pattern in the sub-block. As known in the art, at each filter application, the filter output comprises a convolution result between the 3×3 2D filter array and the 3×3 pixel value array of a particular pixel pattern. In some embodiments, the 3×3 pixel value array comprises a 3×3 array of Luma (Y) values of the particular pixel pattern.

The 2D filter arrays are defined specifically for each sub-block (as shown above) in a way that produces a relatively high filter output (convolution result) when the 2D filter is applied to a pixel pattern that likely contains a medium "corner." In some embodiments, if the filter output exceeds a predetermined threshold value at a particular pixel pattern, the method may determine (at 1540) that the specific position of a medium "corner" in the sub-block is within the particular pixel pattern (referred to as the selected pixel pattern). In other embodiments, if the filter output at a particular pixel pattern produces the highest filter output value in the sub-block, the method may determine (at 1540) that the specific position of a medium "corner" in the sub-block is within the particular pixel pattern (selected pixel pattern).

In some embodiments, the method determines that a position of a particular pixel in a selected pixel pattern comprises the specific position of a medium "corner" in the sub-block depending on the position of the sub-block in the captured image. In these embodiments, for the top-left sub-block, the position of the top-left pixel in the selected pixel pattern comprises the specific position of a medium "corner" in the sub-block. For the bottom-left sub-block, the position of the bottom-left pixel in the selected pixel pattern comprises the specific position of a medium "corner" in the sub-block. For the top-right sub-block, the position of the top-right pixel in the selected pixel pattern comprises the specific position of a medium "corner" in the sub-block. For the bottom-right sub-block, the position of the bottom-right pixel in the selected pixel pattern comprises the specific position of a medium "corner" in the sub-block.

To illustrate, assume that the 2D filter for top-left sub-block is being applied to a 3×3 pixel pattern in the top-left sub-block having the following Luma values (having a range of [0 . . . 255]):

$$\begin{bmatrix} 255 & 255 & 255 \\ 255 & 0 & 0 \\ 255 & 0 & 0 \end{bmatrix}.$$

As shown above, the filter for top-left sub-block is:

$$\begin{bmatrix} 1 & 1 & 1 \\ 1 & -1 & -1 \\ 1 & -1 & -1 \end{bmatrix}.$$

As such, an output of one step in the convolution operation of the 2D filter may be represented as:

1*255+1*255+1*255+1*255+(−1)*0+(−1)*0+1*255+
(−1)*0+(−1)*0=5*255=1275.

Thus, the step output value (1275) of the 2D filter for this pixel pattern is relatively very high and most likely contains the medium "corner" in the sub-block. If a 3×3 pixel pattern does not contain the top-left medium corner, the step output value of the 2D filter would be relatively small since the positive and negative pixel values would cancel each other out. Since the sub-block is the top-left sub-block, the method may determine (at 1540) that the position of the top-left pixel in the pixel pattern comprises the specific position of a medium "corner" in the sub-block.

The pseudo code for the coarse and fine search steps is:

```
projection(x) = sum_y( downSample(x, y));
projection(y) = sum_x( downSample(x, y));
x_peaks[ ] = find_and_sort_peaks(projection(x));
y_peaks[ ] = find_and_sort_peaks(projection(y));
if(x_peaks[ ].projection >= threshold AND y_peaks[ ].projection >=
threshold)
{
   (X_position, Y_position) =
findMax(filter(downSample(x_peaks[ ], y_peaks[ ]), corner filter));
}
else if (x_peaks[ ].projection < threshold)
{
    X_position = image border;
}
else if (y_peaks[ ].projection < threshold)
{
    Y_position = image border;
}
```

The fine searching (2D corner edge filtering) may be performed on a downsized image. In this case, the determined "corner" positions need to be converted to the scaling of the original captured image to be consistent with the resolution/size of the original captured image. This can be done by using a ratio that correlates to the downsizing ratio used to downsize the image. For example, if the original image was downsized by 1/16, the determined "corner" positions can be converted by the following equations:

X_position=X_position*16;

Y_position=Y_position*16;

The fine searching may also be performed on an image at the full resolution of the original captured image to improve accuracy of the medium "corner" and boundary detection. In this case, the "corner" positions determined by the fine searching step do not need to be converted.

The method 1500 then determines (at 1545) the boundary of the medium image using the determined medium "corner" positions, the boundary connecting the four medium "corner" positions. The method then removes (at 1550) the background image from the captured image using the medium boundary (i.e., removes the image from the medium boundary extending to the border of the captured image). In some embodiments, the method expands/maps the image within the medium boundary (i.e., the content and medium images) to the resolution/size of the original captured image. In some embodiments, the method maps/transforms pixels within the medium boundary to the size of the original captured image using a geometric correction step, as discussed below in Section IV. The method then ends.

IV. Compensating for Geometric Distortion in the Content Image

Geometric distortion of text or lines often occurs in the content image due to an off-normal viewing angle when the original image was captured. Such geometric distortion makes text or lines in the content appear tilted or slanted and thus degrades the readability of the content. The geometric correction processing is performed on a captured image to produce text or lines in the content that appear "upright" to improve readability of the content. In some embodiments, the geometric correction processing expands the image within the medium boundary by mapping/transforming pixels within the medium boundary to the size and the coordinate system of the original captured image. Therefore, the geometric correction processing also effectively removes the background image since the background image is not mapped.

Figure 23:
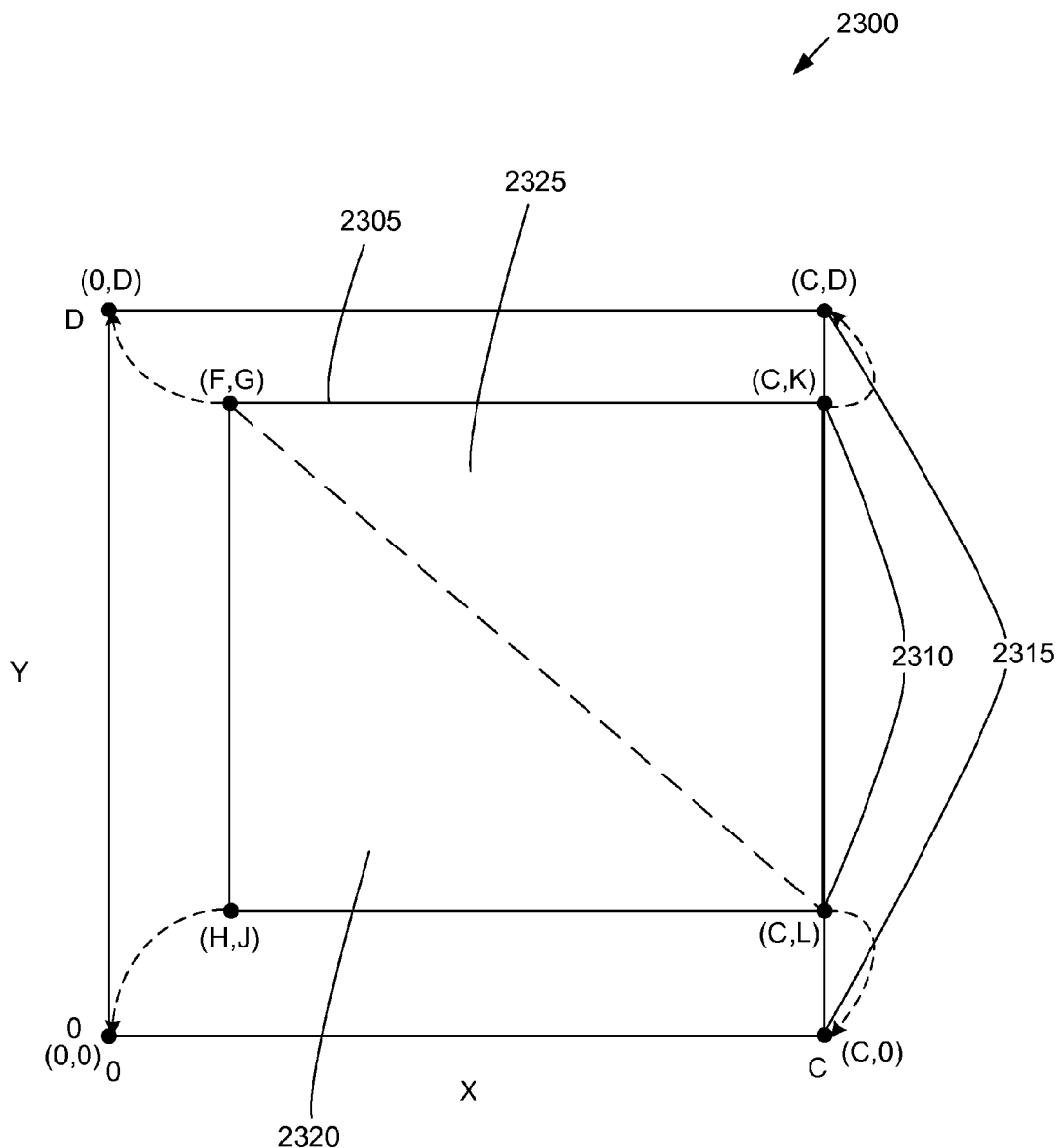
FIG. 23 shows an example of a captured image containing a medium image that is mapped to the size of the captured image.

The geometric correction processing is performed after the medium corners and boundary of the medium image are determined (e.g., using the boundary detection method 1500 of FIG. 15). FIG. 23 shows an example of a captured image 2300 (having four corners 2315) containing a medium image 2305. As shown in FIG. 23, the corners 2310 and the boundary of the medium image 2305 have been determined. Also as shown in FIG. 23, the area within the medium boundary can be divided into two triangle areas 2320 and 2325, the medium corners 2310 comprising the vertices of the two triangle areas 2320 and 2325. In some embodiments, the two triangles 2320 and 2325 comprise the entire area within the medium boundary.

In some embodiments, the X, Y coordinates of each medium corner 2310 is mapped to a corresponding corner 2315 of the captured image 2300. Two linear equations may be used to represent each such mapping:

$$x' = a_1 x + a_2 y + a_3$$

$$y' = b_1 x + b_2 y + b_3 \quad \text{(Eq. 1)}$$

where (x, y) is the coordinate of the medium corner (representing the unmapped/uncorrected pixel) and (x', y') is the coordinate of the captured image corner (representing the mapped/corrected pixel).

As such, for the first triangle 2320, a first set of six linear equations are produced (two linear equations for each mapped vertex) having six unknown variables ($a_1$, $a_2$, $a_3$, $b_1$, $b_2$, $b_3$). For the second triangle 2325, a second set of six linear equations are produced having six unknown variables. Since the three vertices of a triangle do not fall on a straight line, there can be only one set of solutions for the six unknown variables of each set. A first set of solutions for the unknowns is then determined for the first set of linear equations to produce a first set of mapping equations for the first triangle 2320. A second set of solutions for the unknowns is then determined for the second set of linear equations to produce a second set of mapping equations for the second triangle 2325. Each set of mapping equations comprises the two linear equations of Eq. 1 but having determined values for the unknown variables. Each pixel contained within the first triangle can be mapped to the size of the captured image 2300 using the first mapping equation. Likewise, each pixel contained within the second triangle can be mapped to the size of the captured image 2300 using the second mapping equation.

For example, in FIG. 23, for the bottom-left triangle 2320, each medium corner 2310 comprising a vertex of the triangle is mapped to a corresponding corner 2315 of the captured image. These three mappings are represented by the following linear equations:

For the medium corner/vertex at position (F,G) mapping to the image corner (0, D):

$$0 = a_1 F + a_2 G + a_3$$

$$D = b_1 F + b_2 G + b_3.$$

For the medium corner/vertex at position (H, J) mapping to the image corner (0, 0):

$$0 = a_1 H + a_2 J + a_3$$

$$0 = b_1 H + b_2 J + b_3.$$

For the medium corner/vertex at position (C, L) mapping to the image corner (C, 0):

$$C = a_1 C + a_2 L + a_3$$

$$0 = b_1 C + b_2 L + b_3.$$

Since values C, D, F, G, H, J, and L are known, there are only six unknown variables ($a_1$, $a_2$, $a_3$, $b_1$, $b_2$, $b_3$) which can be determined using the six equations. After the unknown variables are determined and the two mapping equations are produced (by plugging in the determined variables into Eq. 1), each pixel contained within the triangle 2320 defined by these three vertices can be mapped to the size and coordinate system of the captured image 2300 using the two mapping equations. The pixels of the top-right triangle 2325 can then be processed in a similar manner.

In other embodiments, the pixels of the image within the medium boundary is mapped/transformed without partitioning the image into two triangles. In these embodiments, the linear equations (Eq. 1) are also used. However, each of the medium corners is mapped to a corresponding corner of the captured image so that only eight linear equations are produced, as opposed to twelve linear equations produced in the two triangle method (six linear equations being produced for each triangle). The six unknown variables ($a_1$, $a_2$, $a_3$, $b_1$, $b_2$, $b_3$) may be determined using the eight linear equations using various methods known in the art (e.g., least mean squares methods, etc.) to produce the two mapping equations. Each pixel of the image within the entire medium boundary is then mapped using the two mapping equations (Eq. 1), wherein (x, y) represent the original coordinates of the pixel and (x', y') represent the mapped coordinates of the pixel.

Note that only the pixels of the captured image inside the medium boundary are mapped, while the pixels of the captured image outside the medium boundary are not mapped to the size and coordinate system of the captured image. This effectively removes the background image (comprising the area between the medium boundary and the border of the captured image) and produces a processed image comprising only the medium and content images.

Figure 24:
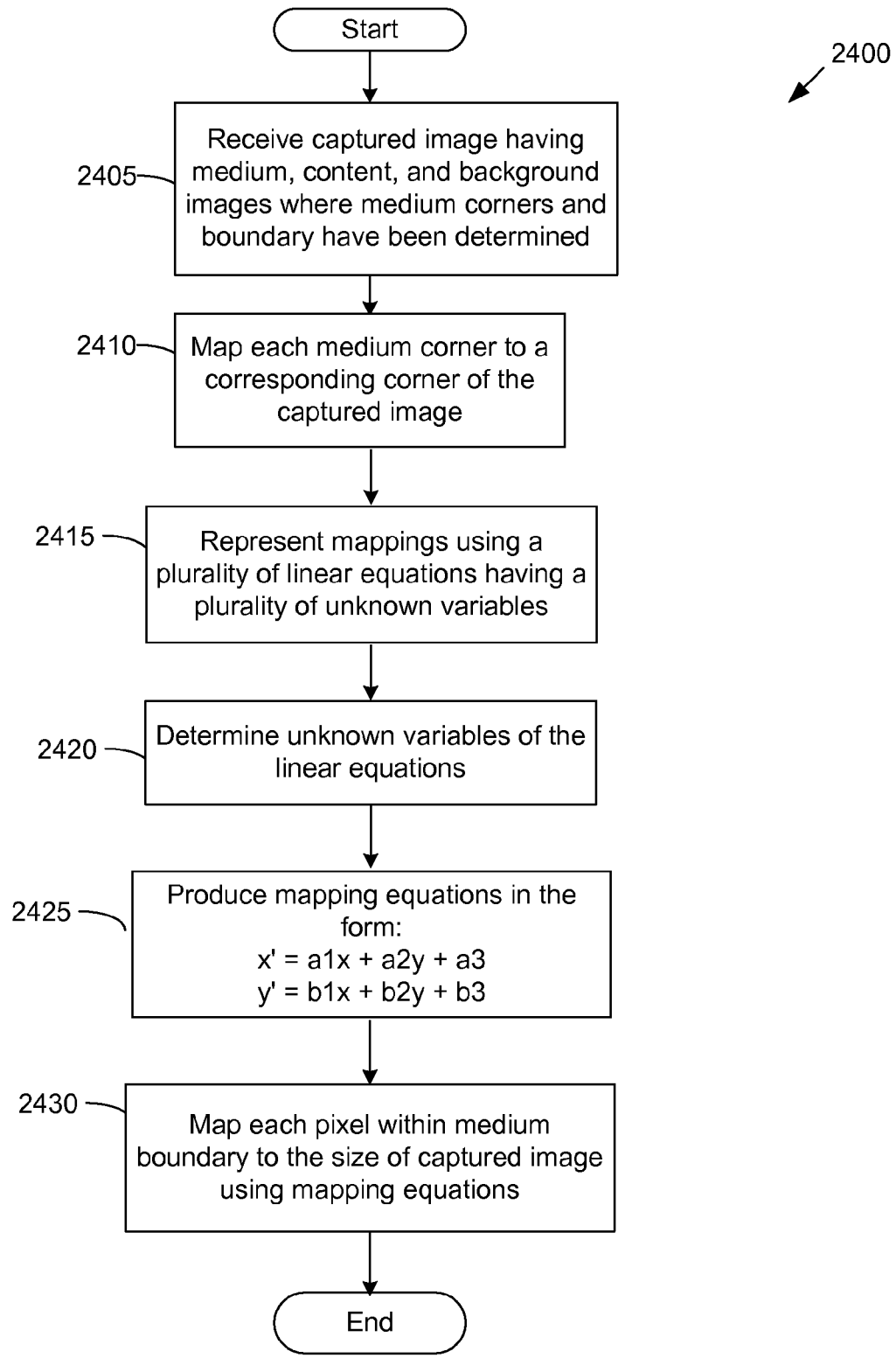
FIG. 24 shows a flowchart of a method for correcting geometric distortion in an image.

FIG. 24 shows a flowchart of a method 2400 for correcting geometric distortion in an image. The method 2400 may be implemented through software and/or hardware configured to implement the method. The method may be implemented on an image-capturing device or on a separate device that receives a captured image for processing. In other embodiments of the method 2400, a different number of steps and/or a different order of steps is used.

The method 2400 begins when a captured image is received (at 2405), the captured image comprising an image of a medium, an image of content on the medium, and an image of a background surrounding the medium. In the captured image, the medium corners and boundary of the medium image have been determined (e.g., using the boundary detection method 1500 of FIG. 15). The method maps (at 2410) each medium corner to a corresponding corner of the captured image and represents (at 2415) the mappings using a plurality of linear equations having a plurality of unknown variables. In some embodiments, the method represents the mappings of the four medium corners using eight linear equations having six unknown variables (two linear equations for each mapping). In other embodiments, the medium corners comprise vertices of two triangles, where each medium corner comprises a particular vertex of a triangle. In these embodiments, the method divides the area within the medium boundary into two triangle areas, the medium corners comprising the vertices of the two triangle areas. For each triangle, the method represents (at 2415) the mappings using six linear equations having six unknown variables.

The method then determines (at 2420) the unknown variables of the linear equations using any variety of methods (e.g., least mean squares methods, etc.). The method then produces (at 2425) mapping equations in the form:

$$x' = a_1 x + a_2 y + a_3$$

$$y' = b_1 x + b_2 y + b_3$$

where set values have been determined for the variables ($a_1$, $a_2$, $a_3$, $b_1$, $b_2$, $b_3$). In the two-triangle method, the method determines separate mapping equations for each triangle.

The method then maps (at 2430) each pixel of the image within the medium boundary to the size and the coordinate system of the original captured image using the mapping equations. In the two-triangle method, the method uses a first set of mapping equations for pixels contained within a first triangle and a second set of mapping equations for pixels contained within a second triangle. The method then ends.

V. Examples of the Image Processing Steps

The examples of the image processing steps provided below are for illustrative purposes only and do not limit the embodiments described herein. For example, the examples described below show a particular order of image processing steps. However, this order of steps may be changed and/or a step may be removed without departing from the embodiments described herein. Further, the examples below relate to images of a whiteboard and a white document. However, images of a board or document of any other color may be used without departing from the embodiments described herein.

FIG. 25A shows an example of a captured image of a whiteboard having content and a background. FIG. 25B shows the captured image of FIG. 25A after the image enhancement step (described in Section II) that recovers the original appearance of the whiteboard and enhances the appearance of the content to improve the visibility of the content. FIG. 25C shows the enhanced image of FIG. 25B after the whiteboard boundary has been determined (as described in Section III) and the whiteboard image and content image have been mapped to the original size of the captured image (as described in Section IV).

Figure 26A:
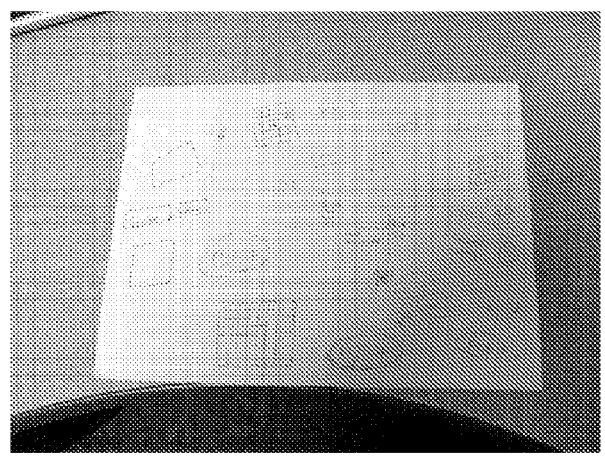
FIG. 26A shows an example of a captured image of a white document.
Figure 26B:
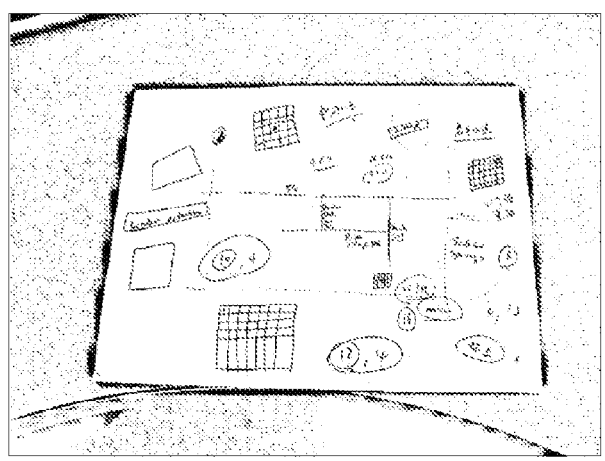
FIG. 26B shows the image of FIG. 26A after the image enhancement step.
Figure 26C:
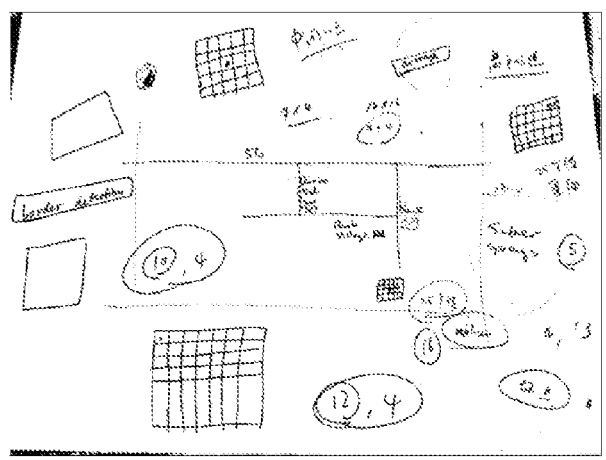
FIG. 26C shows the image of FIG. 26B after the white document boundary has been determined and the whiteboard and content have been mapped.

FIG. 26A shows an example of a captured image of a white document having content and a background. FIG. 26B shows the captured image of FIG. 26A after the image enhancement step (described in Section II) that recovers the original appearance of the white document and enhances the appearance of the content to improve the visibility of the content. FIG. 26C shows the enhanced image of FIG. 26B after the white document boundary has been determined (as described in Section III) and the white document image and content image have been mapped to the original size of the captured image (as described in Section IV).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user device. In the alternative, the processor and the storage medium may reside as discrete components in a user device.

The previous description of the disclosed embodiments is provided to enable any person skilled in the art to make or use the embodiments described herein. Various modifications to these embodiments will be readily apparent to those skilled in the art, and the generic principles defined herein may be applied to other embodiments without departing from the spirit or scope of the embodiments described herein. Thus, the embodiments are not intended to be limited to the specific embodiments shown herein but is to be accorded the widest scope consistent with the principles and novel features disclosed herein.

What is claimed is:

1. A method for processing a captured image, the method comprising:
    obtaining, with an image processing device, a captured image of a medium having content, the captured image comprising an image of the medium, an image of the content and an image of at least a portion of a background to the medium;
    dividing, with the image processing device, the captured image into four quadrants to form four sub-blocks;
    identifying, with the image processing device, four corners, one for each of the sub-blocks, and determining a position of each of the identified corners;
    determining, with the image processing module, a boundary of the medium using the identified positions of the four corners, wherein determining a boundary includes connecting the four identified corners; and
    removing, with the image processing device, the background image based on the determined boundary.

2. The method of claim 1, wherein the medium image comprises an image of all or a portion of a whiteboard, blackboard, or document.

3. The method of claim 1, wherein the content image comprises an image of text or lines.

4. The method of claim 1, wherein determining a position of each of the identified corners comprises:
    performing one or more one-dimensional (1D) projections to determine an approximate position of the one or more of the identified corners.

5. The method of claim 4, wherein:
    the captured image has an X,Y coordinate system, wherein the determined position of one or more of the identified corners comprises X and Y coordinates; and
    performing the one or more 1D projections comprises performing X and Y 1D projections to determine an approximate position of one or more of the identified corners.

6. The method of claim 4, wherein determining a position of each of the identified corners further comprises:
    performing two-dimensional (2D) corner edge filtering to determine a specific position of one or more of the identified corners.

7. The method of claim 1, further comprising:
    removing the content image from the captured image by downsampling the captured image and applying one or more median filters to the captured image; and
    before determining the position of each of the identified corners, obtaining information of images of any edges in the captured image by applying one or more high-pass filters to the captured image.

8. The method of claim 1, wherein removing the background image comprises:
    mapping only pixels of the captured image within the medium boundary to the size of the captured image.

9. An apparatus for processing a captured, the apparatus comprising:
    an image processing module configured to:
        obtain a captured image of a medium having content thereon, the captured image comprising an image of the medium, an image of the content thereon and an image of at least a portion of a background to the medium;
        divide the captured image into four quadrants to form four sub-blocks;
        identify four corners, one for each of the sub-blocks, and determining a position of each of the identified corners;
        determine a boundary of the medium image using the positions of the four corners, wherein determining the boundary comprises connecting the four identified corners; and
        remove the background image based on the determined boundary.

10. The apparatus of claim 9, wherein the medium image comprises an image of all or a portion of a whiteboard, blackboard, or document.

11. The apparatus of claim 9, wherein the content image comprises an image of text or lines.

12. The apparatus of claim 9, wherein the image processing module is configured to determine a position of each of the identified corners by:
    performing one or more one-dimensional (1D) projections to determine an approximate position of one or more of the identified corners; and
    performing two-dimensional (2D) corner edge filtering to determine a specific position of the one or more of the identified corners.

13. The apparatus of claim 9, wherein the image processing module is further configured to:
    remove the content image from the captured image by downsampling the captured image and applying one or more median filters to the captured image; and
    obtain information of images of any edges in the captured image by applying one or more high-pass filters to the captured image.

14. The apparatus of claim 9, wherein the image processing module is configured to remove the background image by:
    mapping only pixels of the captured image within the medium boundary to the size of the captured image.

15. The apparatus of claim 9, further comprising:
    an image capturing device configured to capture images, wherein the apparatus comprises a camera, a document facsimile reading apparatus, a photocopy machine, a business card reader, a bar code scanner, or a document scanner.

16. The apparatus of claim 15, further comprising:
    a mobile communication processor configured to transmit a processed image via a wireless connection, wherein the apparatus comprises a mobile communications device having a camera.

17. A computer readable medium comprising instructions that cause a processor to process a captured image, the instruction further causing the processor to:
    obtain a captured image of a medium having content thereon, the captured image comprising an image of the medium, an image of the content thereon and an image of at least a portion of a background to the medium;
    divide the captured image into four quadrants to form four sub-blocks;
    identify four corners, one for each of the sub-blocks, and determine a position of each of the identified corners;
    determine a boundary of the medium using the identified positions of the four corners, the boundary being determined by connecting the four identified corners; and
    removing the background image based on the determined boundary.

18. The computer readable medium of claim 17, wherein:
the medium image comprises an image of all or a portion of a whiteboard, blackboard, or document; and
the content image comprises an image of text or lines.

19. The computer readable medium of claim 17, wherein the instructions further cause the processor to perform one or more one-dimensional (1D) projections to determine an approximate position of one or more of the identified corners.

20. The computer readable medium of claim 19, wherein the instructions further cause the processor to perform two-dimensional (2D) corner edge filtering to determine a specific position of the one or more of the identified corners.

21. An apparatus configured for processing a captured image the apparatus comprising:
means for obtaining a captured image of a medium having content thereon, the captured image comprising an image of the medium, an image of the content thereon and an image of at least a portion of a background to the medium;
means for dividing the captured image into for quadrants to form four sub-blocks;
means for identifying four corners, one for each of the sub-blocks;
means for determining a position of each of the identified corners;
means for determining a boundary of the medium using the identified positions of the four corners, the boundary being determined by connecting the four identified corners; and
means for removing the background image based on the determined boundary.

22. The apparatus of claim 21, wherein:
the medium image comprises an image of all or a portion of a whiteboard, blackboard, or document; and
the content image comprises an image of text or lines.

23. The apparatus of claim 21, wherein means for determining a position of each of the identified corners comprises means for performing one or more one-dimensional (1D) projections to determine an approximate position of one or more of the identified corners.

24. The apparatus of claim 23, wherein means for determining a position of each of the identified corners comprises means for performing two-dimensional (2D) corner edge filtering to determine a specific position of the one or more of the identified corners.

25. A method for processing a captured image comprising a medium image, a content image within the medium image, and a background image surrounding the medium image, the medium image having a medium boundary and a plurality of medium corners, the method comprising:
mapping, with an image processing module comprising at least some hardware, each medium corner to a corresponding corner of the captured image;
representing, with the image processing module, the mappings with a plurality of linear equations having a plurality of unknown variables to produce a plurality of mapping equations; and
mapping, with the image processing module, pixels within the medium boundary to the size of the captured image using the mapping equations.

26. The method of claim 25, wherein the medium image comprises an image of all or a portion of a whiteboard, blackboard, or document.

27. The method of claim 25, wherein the content image comprises an image of text or lines.

28. The method of claim 25, wherein the mapping equations are in the form:

$$x'=a_1x+a_2y+a_3$$

$$y'=b_1x+b_2y+b_3$$

wherein (x, y) represents the original coordinates of a pixel, (x', y') represents the mapped coordinates of a pixel, and $(a_1, a_2, a_3, b_1, b_2, b_3)$ are the solved variables.

29. The method of claim 25, wherein mapping the pixels within the medium boundary comprises:
dividing the an area within the medium boundary into first and second triangles;
mapping the pixels within the first triangle using a first set of mapping equations; and
mapping the pixels within the second triangle using a second set of mapping equations.

30. The method of claim 25, wherein:
representing the mappings with the plurality of linear equations comprises:
dividing area within the medium boundary into first and second triangles, the medium corners comprising the vertices of the first and second triangles;
representing the mappings of the vertices of the first triangle with a first set of linear equations and unknown variables to produce a first set of mapping equations; and
representing the mappings of the vertices of the second triangle with a second set of linear equations and unknown variables to produce a second set of mapping equations; and
mapping the pixels within the medium boundary comprises:
mapping the pixels within the first triangle using the first set of mapping equations; and
mapping the pixels within the second triangle using the second set of mapping equations.

31. The method of claim 25, further comprising:
dividing the captured image into a plurality of sub-blocks;
determining a position of a corner of the medium image in each sub-block; and
determining a boundary of the medium image using the positions of the medium image corners.

32. An apparatus for processing a captured image comprising a medium image, a content image within the medium image, and a background image surrounding the medium image, the medium image having a medium boundary and a plurality of medium corners, the apparatus comprising:
an image processing module configured to:
map each medium corner to a corresponding corner of the captured image;
represent the mappings with a plurality of linear equations having a plurality of unknown variables to produce a plurality of mapping equations; and
map pixels within the medium boundary to the size of the captured image using the mapping equations.

33. The apparatus of claim 32, wherein the medium image comprises an image of all or a portion of a whiteboard, blackboard, or document.

34. The apparatus of claim 32, wherein the content image comprises an image of text or lines.

35. The apparatus of claim 32, wherein the mapping equations are in the form:

$$x'=a_1x+a_2y+a_3$$

$$y'=b_1x+b_2y+b_3$$

wherein (x, y) represents the original coordinates of a pixel, (x', y') represents the mapped coordinates of a pixel, and ($a_1$, $a_2$, $a_3$, $b_1$, $b_2$, $b_3$) are the solved variables.

36. The apparatus of claim 32, wherein the image processing module is configured to map the pixels within the medium boundary by:
dividing the area within the medium boundary into first and second triangles;
mapping the pixels within the first triangle using a first set of mapping equations; and
mapping the pixels within the second triangle using a second set of mapping equations.

37. The apparatus of claim 32, wherein:
the image processing module is configured to represent the mappings with the plurality of linear equations by:
dividing the area within the medium boundary into first and second triangles, the medium corners comprising the vertices of the first and second triangles;
representing the mappings of the vertices of the first triangle with a first set of linear equations and unknown variables to produce a first set of mapping equations; and
representing the mappings of the vertices of the second triangle with a second set of linear equations and unknown variables to produce a second set of mapping equations; and
the image processing module is configured to map the pixels within the medium boundary by:
mapping the pixels within the first triangle using the first set of mapping equations; and
mapping the pixels within the second triangle using the second set of mapping equations.

38. The apparatus of claim 32, wherein the image processing module is further configured to:
divide the captured image into a plurality of sub-blocks;
determine a position of a corner of the medium image in each sub-block; and
determine a boundary of the medium image using the positions of the medium image corners.

39. The apparatus of claim 32, further comprising:
an image capturing device configured to capture images, wherein the apparatus comprises a camera, a document facsimile reading apparatus, a photocopy machine, a business card reader, a bar code scanner, or a document scanner.

40. The apparatus of claim 39, further comprising:
a mobile communication processor configured to transmit a processed image via a wireless connection, wherein the apparatus comprises a mobile communications device having a camera.

41. A computer readable medium comprising instructions that cause a processor to process a captured image comprising a medium image, a content image within the medium image, and a background image surrounding the medium image, the medium image having a medium boundary and a plurality of medium corners, the instructions further causing the processor to:
map each medium corner to a corresponding corner of the captured image;
represent the mappings with a plurality of linear equations having a plurality of unknown variables to produce a plurality of mapping equations; and
map pixels within the medium boundary to the size of the captured image using the mapping equations.

42. The computer readable medium of claim 41, wherein:
the medium image comprises an image of all or a portion of a whiteboard, blackboard, or document; and
the content image comprises an image of text or lines.

43. The computer readable medium of claim 41, wherein the instructions further cause the processor to:
divide the area within the medium boundary into first and second triangles;
map the pixels within the first triangle using a first set of mapping equations; and
map the pixels within the second triangle using a second set of mapping equations.

44. The computer readable medium of claim 41, wherein the instructions further cause the processor to:
divide the captured image into a plurality of sub-blocks;
determine a position of a corner of the medium image in each sub-block; and
determine a boundary of the medium image using the positions of the medium image corners.

45. An apparatus configured for processing a captured image comprising a medium image, a content image within the medium image, and a background image surrounding the medium image, the medium image having a medium boundary and a plurality of medium corners, the apparatus comprising:
means for mapping each medium corner to a corresponding corner of the captured image;
means for representing the mappings with a plurality of linear equations having a plurality of unknown variables to produce a plurality of mapping equations; and
means for mapping pixels within the medium boundary to the size of the captured image using the mapping equations.

46. The apparatus of claim 45, wherein:
the medium image comprises an image of all or a portion of a whiteboard, blackboard, or document; and
the content image comprises an image of text or lines.

47. The apparatus of claim 45, wherein means for mapping the pixels within the medium boundary comprises:
means for dividing the area within the medium boundary into first and second triangles;
means for mapping the pixels within the first triangle using a first set of mapping equations; and
means for mapping the pixels within the second triangle using a second set of mapping equations.

48. The apparatus of claim 45, further comprising:
means for dividing the captured image into a plurality of sub-blocks;
means for determining a position of a corner of the medium image in each sub-block; and
means for determining a boundary of the medium image using the positions of the medium image corners.

* * * * *

UNITED STATES PATENT AND TRADEMARK OFFICE
CERTIFICATE OF CORRECTION

PATENT NO.       : 7,724,953 B2                                    Page 1 of 1
APPLICATION NO.  : 11/533664
DATED            : May 25, 2010
INVENTOR(S)      : Li et al.

It is certified that error appears in the above-identified patent and that said Letters Patent is hereby corrected as shown below:

Column 22, line 12, claim 29: "the an area" to read as --an area--

Signed and Sealed this
Fifth Day of July, 2011

David J. Kappos
*Director of the United States Patent and Trademark Office*